(12) United States Patent
Saito et al.

(10) Patent No.: US 11,491,503 B2
(45) Date of Patent: Nov. 8, 2022

(54) COATING MATERIAL MIST REMOVER AND COATING EQUIPMENT

(71) Applicants: TRINITY INDUSTRIAL CORPORATION, Toyota (JP); TOYOTA JIDOSHA KABUSHIKI KAISHA, Toyota (JP)

(72) Inventors: Ryota Saito, Toyota (JP); Shigeki Fujiwara, Toyota (JP); Kenji Tajima, Nagoya (JP); Kai Takishima, Nisshin (JP)

(73) Assignees: TRINITY INDUSTRIAL CORPORATION, Toyota (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 104 days.

(21) Appl. No.: 16/881,176

(22) Filed: May 22, 2020

(65) Prior Publication Data
US 2020/0398300 A1    Dec. 24, 2020

(30) Foreign Application Priority Data

Jun. 19, 2019  (JP) .............................. JP2019-114010

(51) Int. Cl.
*B05B 14/43*       (2018.01)
*B05B 16/00*       (2018.01)
(Continued)

(52) U.S. Cl.
CPC .......... *B05B 14/43* (2018.02); *B01D 46/0002* (2013.01); *B01D 46/4227* (2013.01); *B05B 16/90* (2018.02)

(58) Field of Classification Search
USPC .................................... 118/326, 634; 55/466
See application file for complete search history.

(56) References Cited

U.S. PATENT DOCUMENTS

| 4,225,328 A | 9/1980 | Stiehl |
| 4,401,445 A | 8/1983 | Browning |

(Continued)

FOREIGN PATENT DOCUMENTS

| CN | 104968440 A | 10/2015 |
| CN | 106457296 A | 2/2017 |

(Continued)

OTHER PUBLICATIONS

Feb. 9, 2021 Office Action issued in Japanese Patent Application No. 2019-114010.

(Continued)

*Primary Examiner* — Yewebdar T Tadesse
(74) *Attorney, Agent, or Firm* — Oliff PLC

(57) ABSTRACT

A coating material mist remover of the present disclosure includes: a first duct that discharges air containing coating material mist from an outflow port directed downward; a second duct having an inflow port opened in a horizontal direction; and an incinerable intermediate filter that is detachably connected between the first duct and the second duct and removes the coating material mist from the air. The coating material mist remover also includes: a first connection mechanism that can connect and separate the first duct and the intermediate filter; and a second connection mechanism that can connect and separate the second duct and the intermediate filter.

19 Claims, 14 Drawing Sheets

(51) Int. Cl.
   *B01D 46/00*   (2022.01)
   *B01D 46/42*   (2006.01)

(56) References Cited

U.S. PATENT DOCUMENTS

| | | | |
|---|---|---|---|
| 9,321,070 | B2 | 4/2016 | Link et al. |
| 10,596,504 | B2 | 3/2020 | Wieland et al. |
| 10,646,891 | B2 | 5/2020 | Zebisch et al. |
| 2014/0202332 | A1 | 7/2014 | Link et al. |
| 2014/0366798 | A1 | 12/2014 | Katefidis et al. |
| 2015/0375251 | A1 | 12/2015 | Roeckle |
| 2016/0023231 | A1 | 1/2016 | Schmeinck et al. |
| 2016/0288036 | A1 | 10/2016 | Wieland et al. |
| 2017/0095825 | A1 | 4/2017 | Manabe et al. |
| 2018/0207669 | A1 | 7/2018 | Zebisch et al. |
| 2018/0311695 | A1* | 11/2018 | Saito ............... B05B 16/40 |
| 2019/0076869 | A1 | 3/2019 | Frohlich et al. |
| 2020/0179853 | A1 | 6/2020 | Wieland et al. |

FOREIGN PATENT DOCUMENTS

| | | | |
|---|---|---|---|
| CN | 107921456 A | | 4/2018 |
| CN | 108043162 A | | 5/2018 |
| CN | 108698067 A | | 10/2018 |
| DE | 10 2008 029 052 A1 | | 12/2009 |
| DE | 102013002041 A1 | | 8/2014 |
| DE | 102013011107 A1 | | 8/2014 |
| DE | 102017116663 A1 | | 1/2019 |
| JP | S50-099956 A | | 8/1975 |
| JP | S51-086541 A | | 7/1976 |
| JP | S59-069174 A | | 4/1984 |
| JP | H07-313825 A | | 12/1995 |
| JP | 2001-300370 A | | 10/2001 |
| JP | 2011-000562 A | | 1/2011 |
| JP | 2014-527462 A | | 10/2014 |
| JP | 2016-518956 A | | 6/2016 |
| JP | 2016-155051 A | | 9/2016 |
| JP | 2016-538118 A | | 12/2016 |
| JP | 6096771 B2 | | 3/2017 |
| JP | 2018-531777 A | | 11/2018 |
| JP | 2018183715 A | | 11/2018 |
| WO | 2013013780 A1 | | 1/2013 |

OTHER PUBLICATIONS

U.S. Appl. No. 17/161,957, filed Jan. 29, 2021 in the name of Ryota Saito et al.
Oct. 9, 2020 Extended European Search Report issued in European Patent Application No. 20178937.7.
Aug. 18, 2021 Office Action issued in Chinese Patent Application No. 202010541930.3.
Jan. 12, 2022 Office Action issued in Chinese Patent Application No. 202010541930.3.
May 10, 2022 Office Action issued in Chinese Patent Application No. 202110122029.7.

\* cited by examiner

COATING MATERIAL MIST REMOVER AND COATING EQUIPMENT

BACKGROUND OF THE INVENTION

(1) Field of the Invention

The present disclosure relates to a coating material mist remover and coating equipment for removing coating material mist from the air.

(2) Description of Related Art

As a conventional coating material mist remover, there has been known a coating material mist remover that brings coating material mist into contact with water or water mist to remove (see, for example, JP 2016-155051 A (FIGS. 2 and 8)).

SUMMARY OF THE INVENTION

However, the above-mentioned conventional coating material mist remover requires water circulation equipment, and thus there is a problem that a large installation space is needed. Therefore, development of a technique capable of solving the problem has been demanded.

A coating material mist remover according to one aspect of the present disclosure, which is made to solve the above-described problem, is a coating material mist remover including: a first duct that discharges air containing coating material mist from an outflow port directed downward; a second duct having an inflow port directed in a horizontal direction; an intermediate filter that has a first duct connection portion on an upper face and a second duct connection portion on a side face, removes the coating material mist from the air, and is incinerable, the first duct connection portion being detachably connected to the outflow port of the first duct, and the second duct connection portion being detachably connected to the inflow port of the second duct; a first connection mechanism that movably supports the first duct or the intermediate filter to a connection position where the first duct and the intermediate filter are connected to each other and to a separation position where the first duct and the intermediate filter are separated from each other, and holds the first duct and the intermediate filter at the connection and separation positions; and a second connection mechanism that movably supports the second duct or the intermediate filter to a connection position where the second duct and the intermediate filter are connected to each other and to a separation position where the second duct and the intermediate filter are separated from each other, and holds the second duct and the intermediate filter at the connection and separation positions.

DETAILED DESCRIPTION OF PREFERRED EMBODIMENTS

First Embodiment

Figure 1:
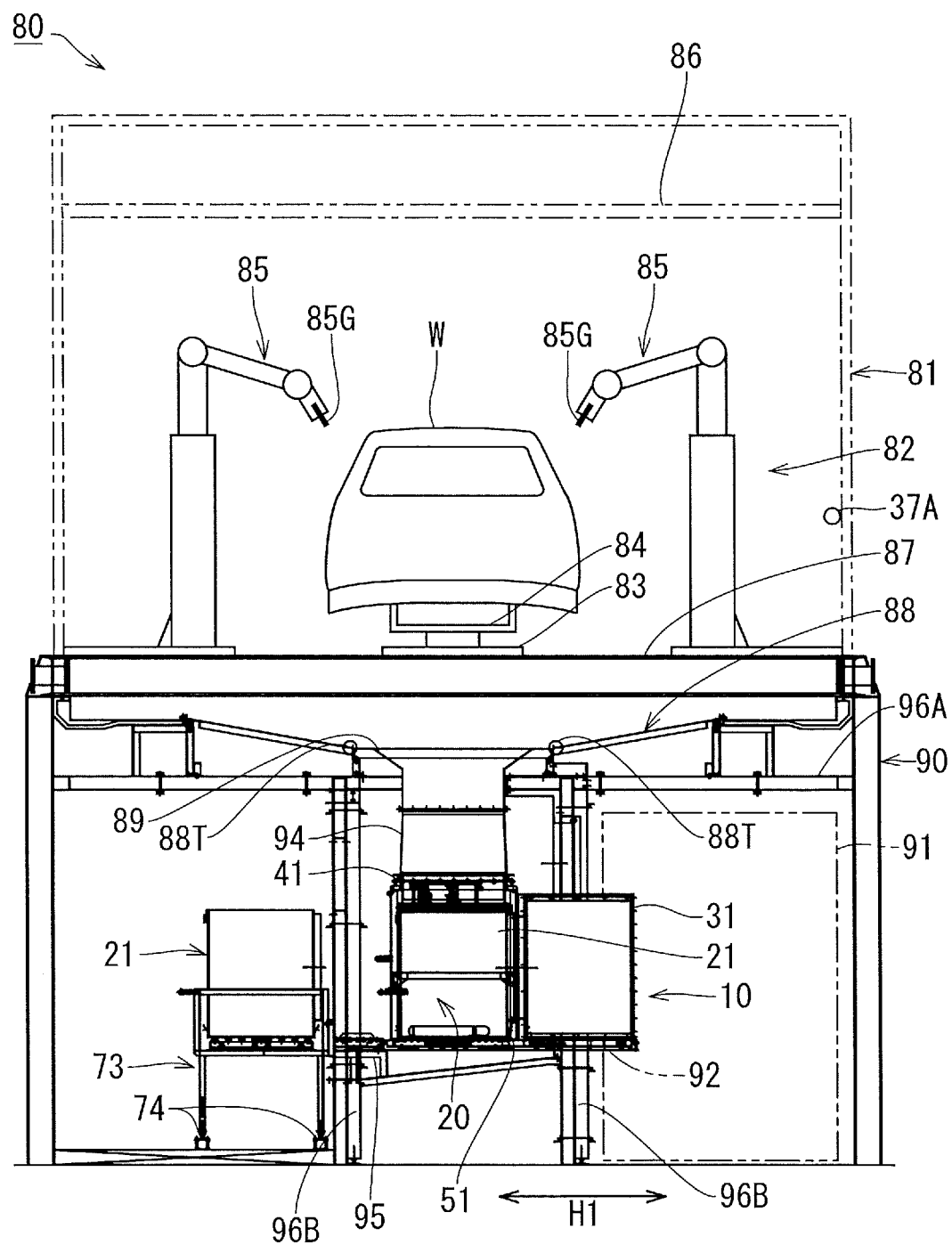
FIG. 1 is a sectional view of a coating area in coating equipment according to a first embodiment.

Hereinafter, an embodiment of coating equipment 80 will be described with reference to FIGS. 1 to 14. As shown in FIG. 1, the coating equipment 80 according to the present embodiment has a coating booth 81, an exhaust duct 91, and a plurality of coating material mist removers 10 (only one coating material mist remover 10 is shown in FIG. 1) connecting therebetween. The coating booth 81 extends in a direction perpendicular to the paper surface of the drawing and covers a coating line 82 extending in that direction. For example, the coating line 82 uses an automobile component as a coating target workpiece W and has a conveyance rail 83, a conveyance carriage 84 which moves on the conveyance rail 83, and a plurality of coating robots 85 arranged on both sides of the conveyance rail 83.

The interior of the coating booth 81 is divided into a coating area and a drying area (not shown). The coating area is where the plurality of coating robots 85 are disposed, and the drying area is where the coating target workpiece W is dried on the upstream side and the downstream side from the coating area. Note that heated air is supplied into the drying area of the coating booth 81 from outside. Then, the coating target workpiece W is mounted on the conveyance carriage 84, enters one end of the coating booth 81, is dried in the drying area, and is then moved to the coating area. In the coating area, coating material mist ejected from coating guns 85G of the coating robot 85 is sprayed on the coating target workpiece W, thereby coating the coating target workpiece W. Then, to dry the coating target workpiece W again, the coating target workpiece W goes out of the coating area to the drying area.

As shown in FIG. 1, a ceiling wall 86 is provided at a position near the upper end of the coating booth 81 in the coating area. The ceiling wall 86 has a mesh structure, and compressed air is supplied above the ceiling wall 86. Accordingly, air flows down from the ceiling wall 86, and unattached coating material mist that has not adhered to the coating target workpiece W is directed downward.

A floor 87 of the coating booth 81, which is also the floor of the coating line 82, has a crosspiece structure (not shown), and an underfloor wall 88 is provided below the floor 87. The underfloor wall 88 is the lowest at a center portion thereof in the width direction and includes a pair of inclined portions on both sides of the center portion.

At the center portion of the underfloor wall 88, a plurality of exhaust ports 89 (only one exhaust port 89 is shown in FIG. 1) is provided and arranged in a line in the longitudinal direction of the coating line 82. The plurality of exhaust ports 89 is, for example, quadrangular. Moreover, in the coating area, a pair of weirs 88T protrudes upward from the boundaries between the center portion and the pair of inclined portions. Accordingly, even if liquid drips from the coating robots 85 or the like onto the underfloor wall 88 and travels along the inclined portions, the liquid is prevented from entering the exhaust ports 89.

The coating equipment 80 includes a plurality of portal mountings 90 (only one mounting 90 is shown in FIG. 1) that support the coating booth 81 from below, and a space is secured below the coating booth 81. Then, the aforementioned exhaust duct 91 is provided below one side portion from the center portion of the coating booth 81. The exhaust duct 91 has a quadrangular cross section, extends parallel to the coating booth 81, and is placed on the floor surface of a factory.

Figure 2:
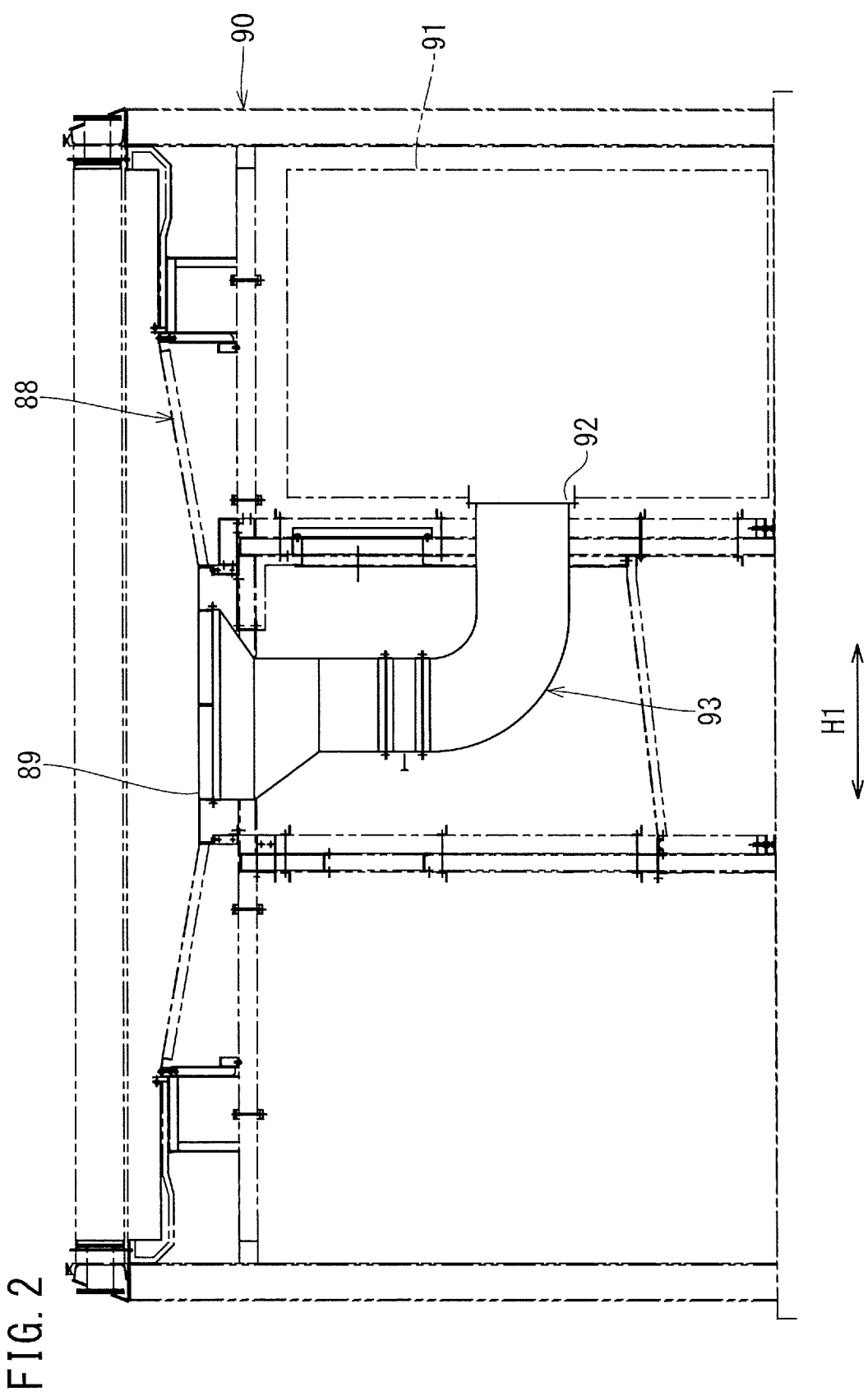
FIG. 2 is a sectional view of a preheat area in the coating equipment.

A plurality of vacuum holes 92 (only one vacuum hole 92 is shown in FIG. 1) is formed on one side of the exhaust duct 91. Moreover, the plurality of vacuum holes 92 is corresponding to the plurality of exhaust ports 89 of the underfloor wall 88 of the coating booth 81. Then, each coating material mist remover 10 is connected between each exhaust port 89 and each corresponding vacuum hole 92 in the coating area. The coating material mist removers 10 are also connected between the exhaust ports 89 and the corresponding vacuum holes 92 at the end portions of the drying area and a preheat area near the coating area. Moreover, L-shaped ducts 93 shown in FIG. 2 are connected, for example, between the plurality of other exhaust ports 89 and vacuum holes 92.

The interior of the exhaust duct 91 is kept in a negative pressure state by a blower (not shown). Accordingly, the air in the coating booth 81 is taken into the exhaust duct 91 through the coating material mist removers 10 and the L-shaped ducts 93. At this time, the coating material mist is removed from the air containing the unattached coating material mist in the coating booth 81 in the coating material mist removers 10, and then the air is directed to the exhaust duct 91. The air that does not contain the coating material mist in the coating booth 81 passes through the L-shaped ducts 93 and is directly directed to the exhaust duct 91. Then, the air in the exhaust duct 91 is discharged out of the factory after being subjected to, for example, volatile organic gas (VOC) removal treatment by a deodorizer (not shown).

Hereinafter, the coating material mist remover 10 will be described in detail. As shown in FIG. 1, a relay duct 94 having a rectangular cross section is hung from the opening edge of the exhaust port 89 to which the coating material mist remover 10 is attached. Then, the coating material mist remover 10 is fixed to the lower end portion of the relay duct 94 and the opening edge of the vacuum hole 92 in the exhaust duct 91.

Figure 3:
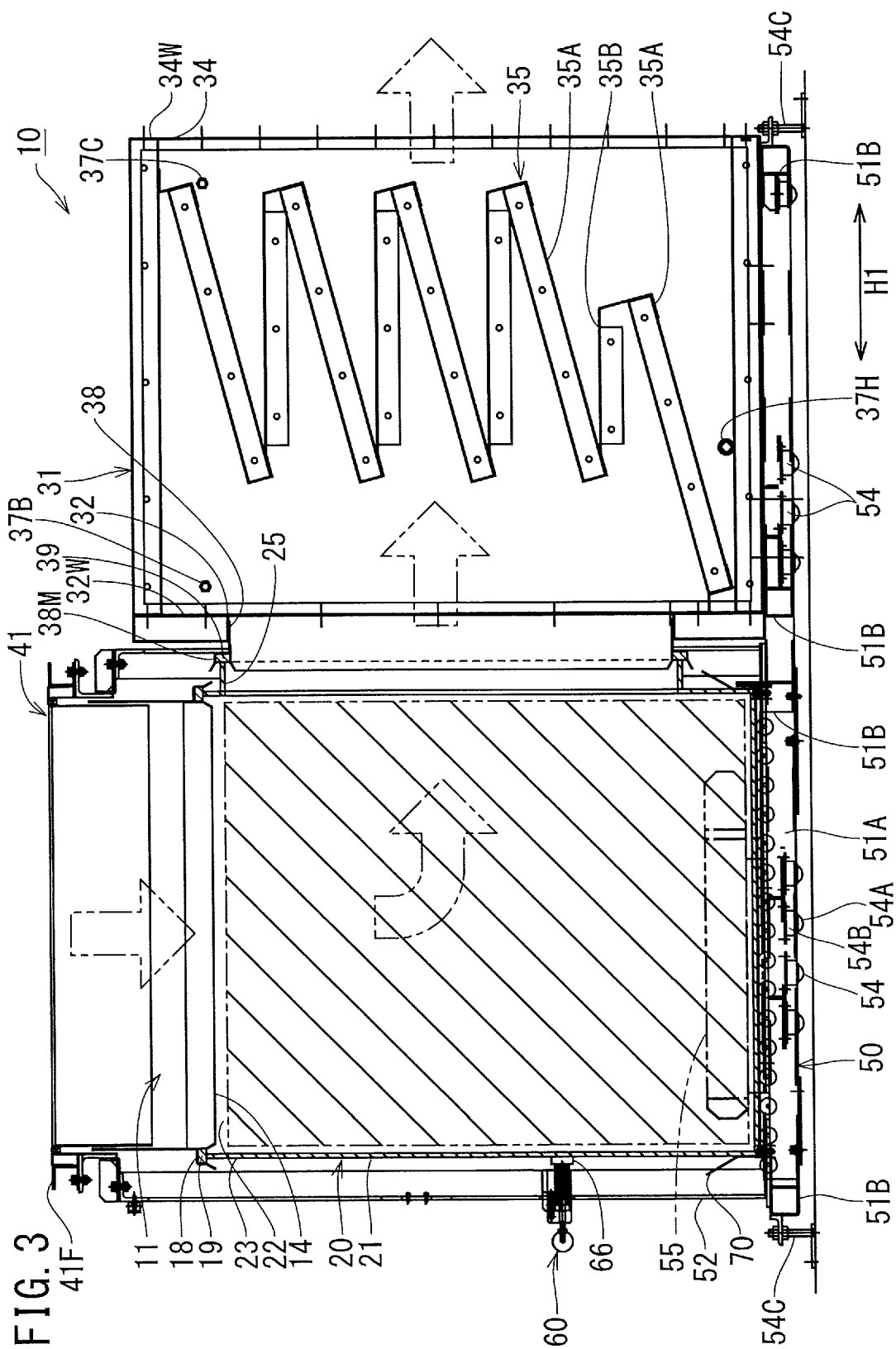
FIG. 3 is a side sectional view of a coating material mist remover.
Figure 4:
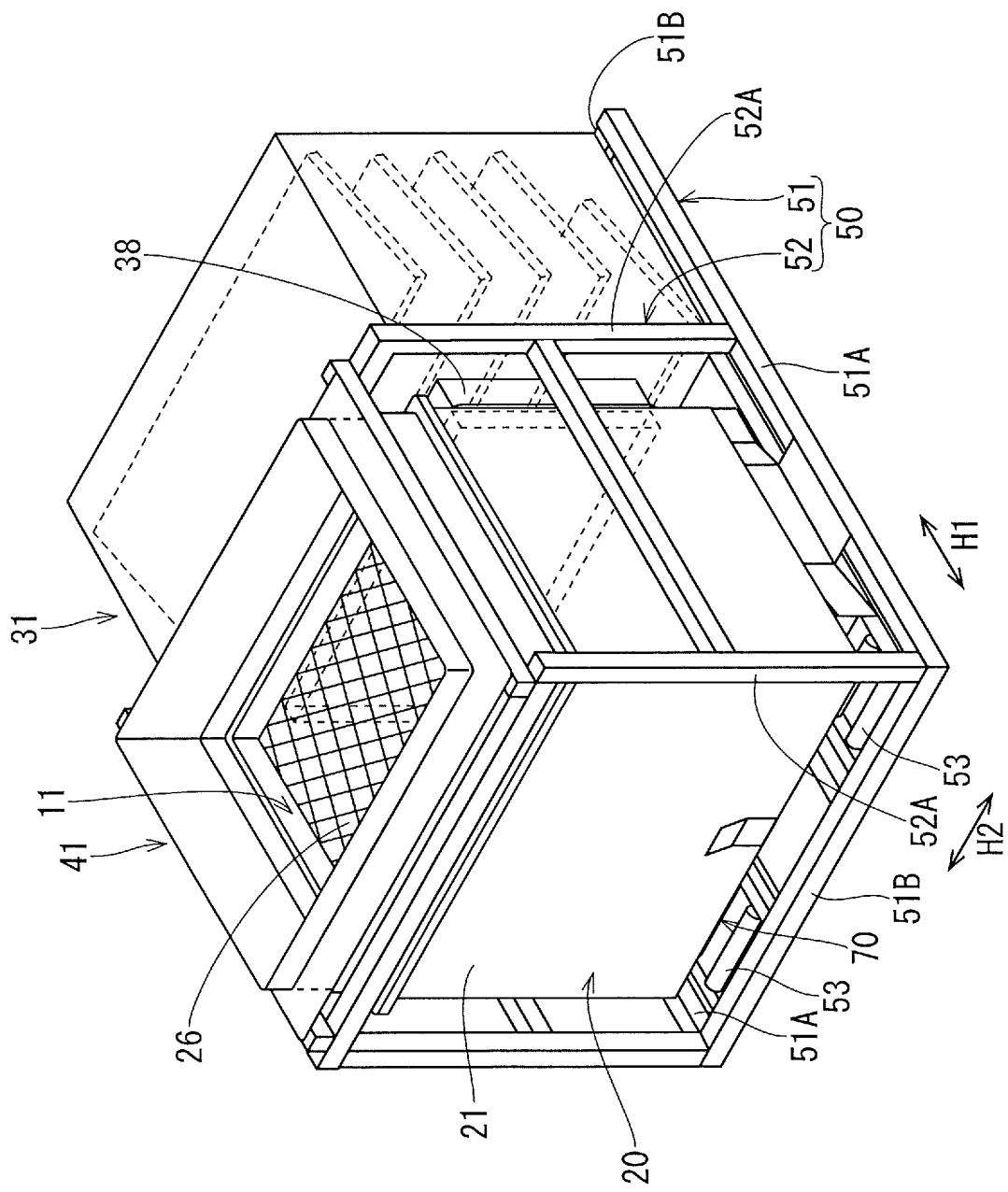
FIG. 4 is a perspective view of the coating material mist remover.
Figure 5:
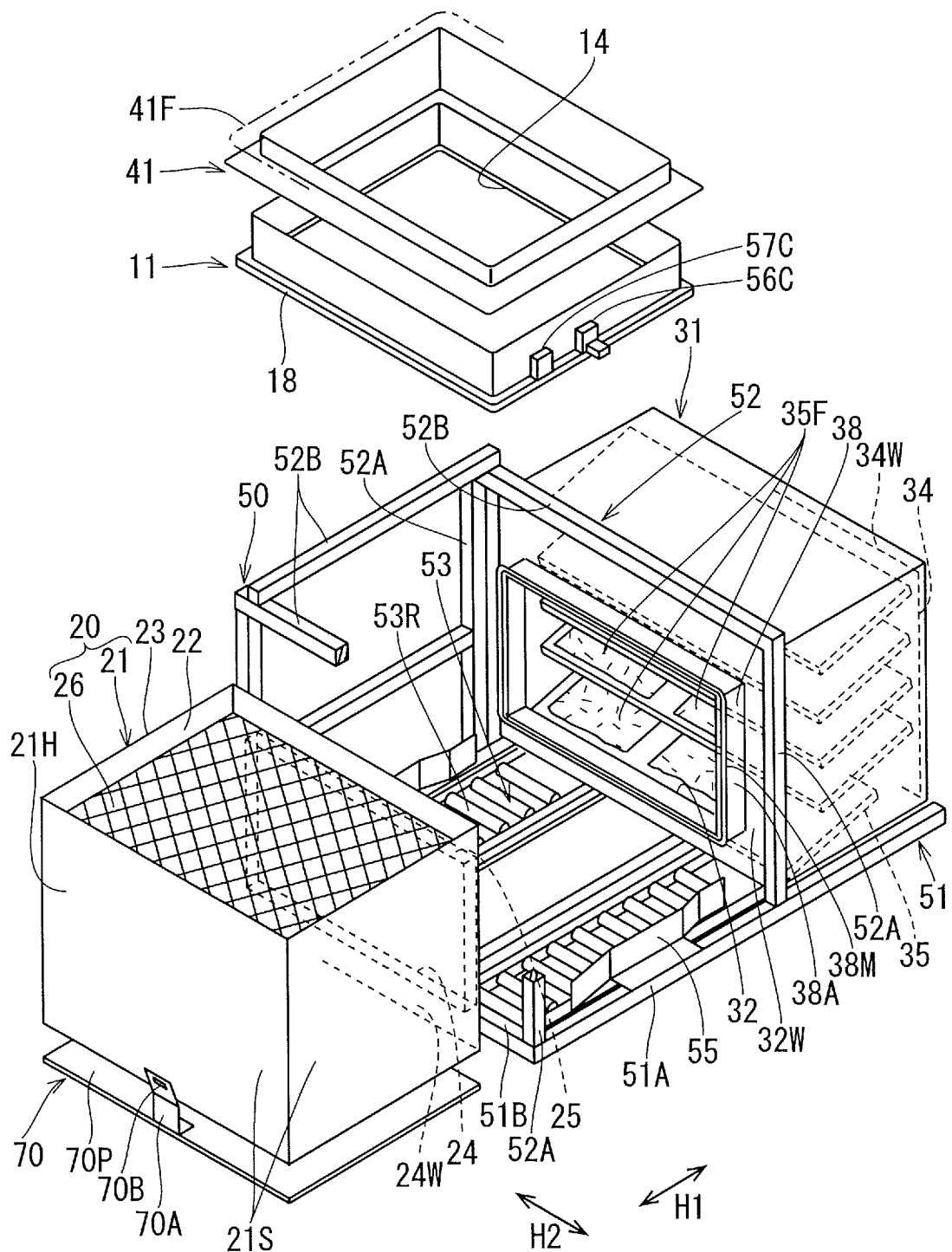
FIG. 5 is an exploded perspective view of the coating material mist remover.

FIG. 3 shows a single unit of the coating material mist remover 10. FIG. 4 shows a simplified view of the single unit of the coating material mist remover 10. FIG. 5 further shows an exploded simplified view of the coating material mist remover 10. As shown in FIG. 5, the coating material mist remover 10 includes first to third ducts 11, 31 and 41 supported by a support frame 50. First, the second duct 31 will be described.

The second duct 31 has a rectangular parallelepiped shape as a whole and includes an inflow port 32 and an outflow port 34 on a pair of opposing side walls. Hereinafter, the opposing direction of the pair of side walls having the inflow port 32 and the outflow port 34 is referred to as a first horizontal direction H1, and a horizontal direction perpendicular thereto is referred to as a second horizontal direction H2.

The inflow port 32 has a quadrangular shape, and a frame-shaped outer edge wall 32W stays around the inflow port 32 on one side wall of the second duct 31. In addition, the outflow port 34 has a quadrangular shape larger than that of the inflow port 32, and an outer edge wall 34W having a narrower width than the outer edge wall 32W stays around the outflow port 34 on the other side wall.

As shown in FIG. 3, the interior of the second duct 31 is partitioned by a partition 35 into an upstream side and a downstream side in the first horizontal direction H1. The partition 35 has a structure in which a plurality of inclined plates 35A and a plurality of horizontal plates 35B are alternately arranged in the vertical direction and connected. The plurality of inclined plates 35A and the plurality of horizontal plates 35B have a band shape extending in the second horizontal direction H2 (the direction perpendicular to the paper surface of FIG. 3), and both ends are fixed to a pair of opposing side walls of the second duct 31 in the second horizontal direction H2. Moreover, the inclined plates 35A are inclined so that the downstream sides are higher while the horizontal plates 35B are horizontal.

The upstream edge portion of the lowermost inclined plate 35A is joined to the inner lower surface of the second duct 31, and the horizontal plate 35B is turned back from the downstream edge portion of that inclined plate 35A to the horizontal upstream side. Furthermore, the next inclined plate 35A is turned back to an obliquely upward downstream side from the upstream edge portion of that horizontal plate 35B, and the subsequent inclined plates 35A and horizontal plates 35B are similarly alternately arranged and connected. Finally, the downstream edge portion of the uppermost inclined plate 35A is joined to the inner upper surface of the second duct 31.

The plurality of inclined plates 35A has a mesh structure. A sheet-shaped downstream filter 35F (see FIG. 5) is laid on the upper surface of each inclined plate 35A, and a retaining fence (not shown) for fixing the filter is stacked on the downstream filter 35F. In addition, the downstream filter 35F is formed of an incinerable material. Specifically, the downstream filter 35F is formed by stacking a plurality of partially cut sheets having a net structure.

As shown in FIG. 3, pressure sensors 37B and 37C are attached to the upstream side and the downstream side from the partition 35 in the upper portion of the second duct 31, respectively. A pressure sensor 37A is also provided in the coating booth 81 as shown in FIG. 1. Moreover, the detection results of the pressure sensors 37A to 37C are taken into, for example, a computer provided in a monitoring room of a factory. When the difference between the pressures detected by the pressure sensors 37B and 37C is higher than a preset first reference pressure, it is determined that the degree of clogging of the downstream filter 35F is high, and respective different warning lights provided in the coating material mist removers 10 and the monitoring room of the factory are turned on. Furthermore, when the difference between the pressures detected by the pressure sensors 37A and 37B is higher than a preset second reference pressure, it is determined that the degree of clogging of an intermediate filter 20, which will be described later, is high, and respective different warning lights provided in the coating material mist removers 10 and the monitoring room of the factory are turned on.

Note that the lower portion of the second duct 31 is provided with a drain hole 37H as shown in FIG. 3 and is usually closed with a closing plug.

Figure 6:
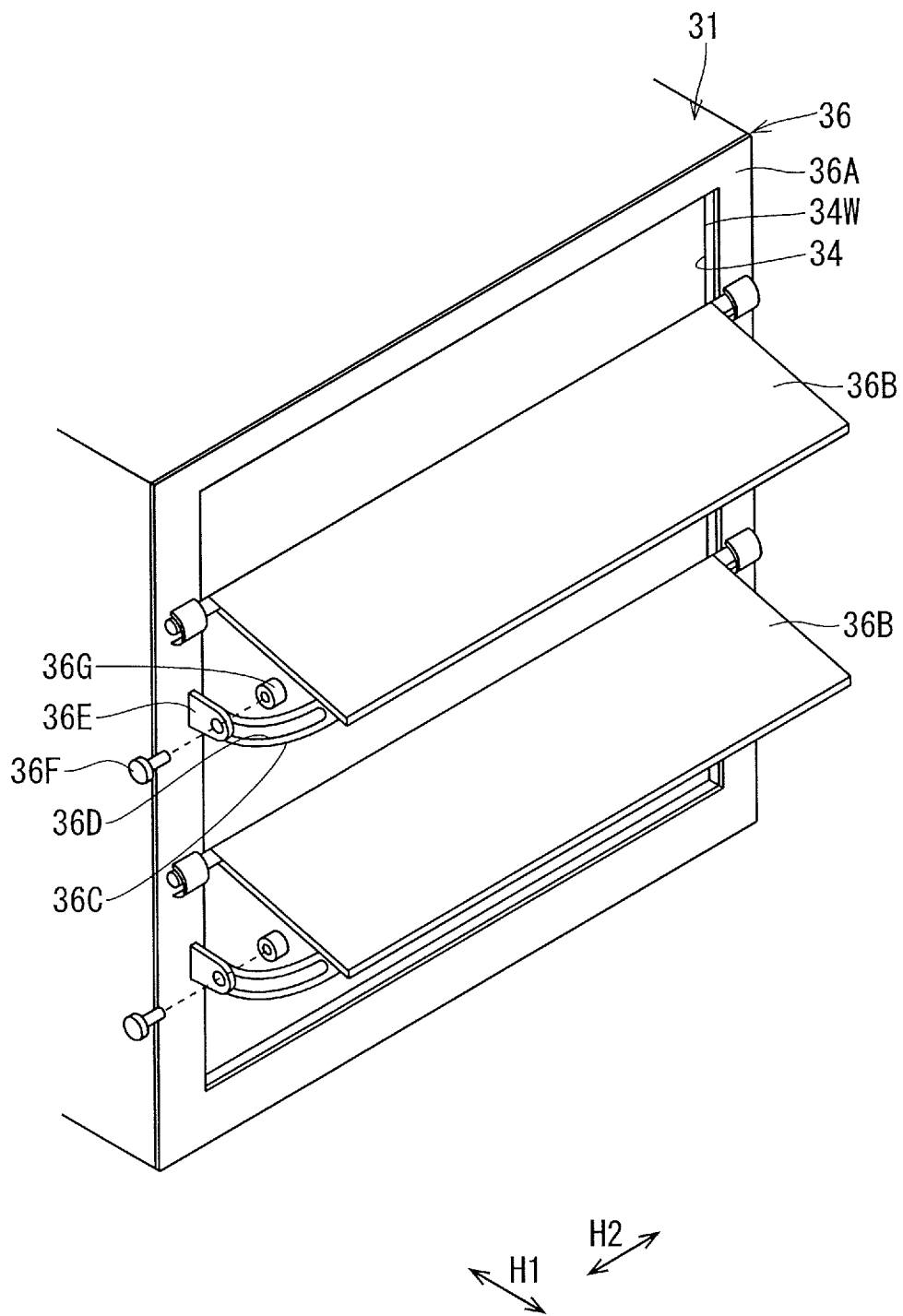
FIG. 6 is a partial perspective view of a second duct.

The outer edge wall 34W of the outflow port 34 of the second duct 31 is provided with a flow rate adjuster 36 shown in FIG. 6. The flow rate adjuster 36 includes a frame-shaped base 36A and a plurality of band-shaped rotary blades 36B. The frame-shaped base 36A is stacked on the outer edge wall 34W of the second duct 31, and the plurality of rotary blades 36B extends in the second horizontal direction H2 and have both ends hinged to both sides of the frame-shaped base 36A. In addition, an arc-shaped protruding piece 36C is provided, extending from the tip of one side of each rotary blade 36B along the rotary locus of the tip. An arc-shaped long hole 36D is formed in the arc-shaped protruding piece 36C. A bolt 36F supported by a support protrusion 36E protruding from the frame-shaped base 36A penetrates the long hole 36D and is screwed into a nut 36G. Thus, if the screw between the bolt 36F and the nut 36G is loosened, the rotary blade 36B can be moved to any desired rotary position. Then, the opening degree of the outflow port 34 can be changed by the flow rate adjuster 36 to adjust the fluid resistance of the second duct 31.

Figure 7:
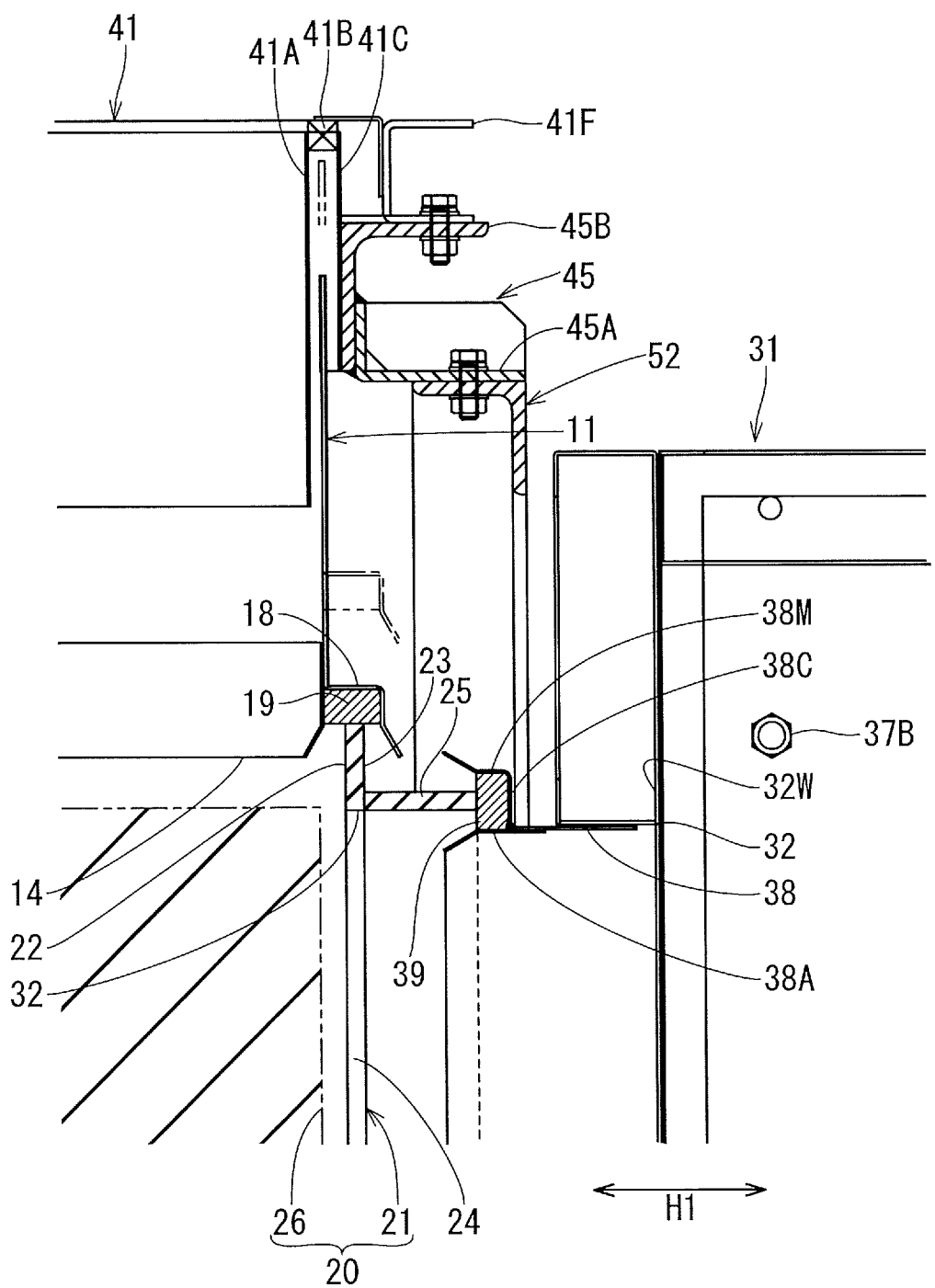
FIG. 7 is an enlarged side sectional view of part of the coating material mist remover.

As shown in FIG. 5, a frame-shaped protruding wall 38 surrounding the inflow port 32 protrudes from the outer opening edge of the inflow port 32 of the second duct 31, and a groove 38M is formed at the tip of the frame-shaped protruding wall 38. Specifically, as shown in FIG. 7, an inner frame wall 38A is stacked and fixed at midway of the frame-shaped protruding wall 38 in the first horizontal direction H1. Then, a portion of the frame-shaped protruding wall 38, which is closer to the tip than the portion where the inner frame wall 38A is fixed, is bent outward in a crank shape so that the aforementioned groove 38M is formed. Moreover, a groove bottom 38C of the groove 38M is perpendicular to the first horizontal direction H1, and a pair of opposing groove sides across the groove bottom 38C have tip sides which are farther from the groove bottom 38C than intermediate positions and open in V-shape. A frame-shaped second packing 39 is received by the groove 38M at a position closer to the groove bottom 38C than the portion opened in V-shape. The second packing 39 is made of, for example, a foamed elastic member such as a sponge, but may be an unfoamed elastic member or nonwoven fabric.

As shown in FIG. 4, the support frame 50 includes a box-shaped frame 52 on a base frame 51. The base frame 51 is constituted of a pair of first bars 51A and a plurality of second bars 51B. The pair of first bars 51A extends parallel in the first horizontal direction H1. The plurality of second bars 51B connects between both ends of the pair of first bars 51A and between the intermediate portions of the pair of first bars 51A as shown in FIG. 3. As shown in FIG. 4, the second duct 31 is fixed on one end side of the base frame 51 from the intermediate portions in the first horizontal direction H1 while the box-shaped frame 52 is fixed on the other end side from the intermediate portions.

Figure 12:
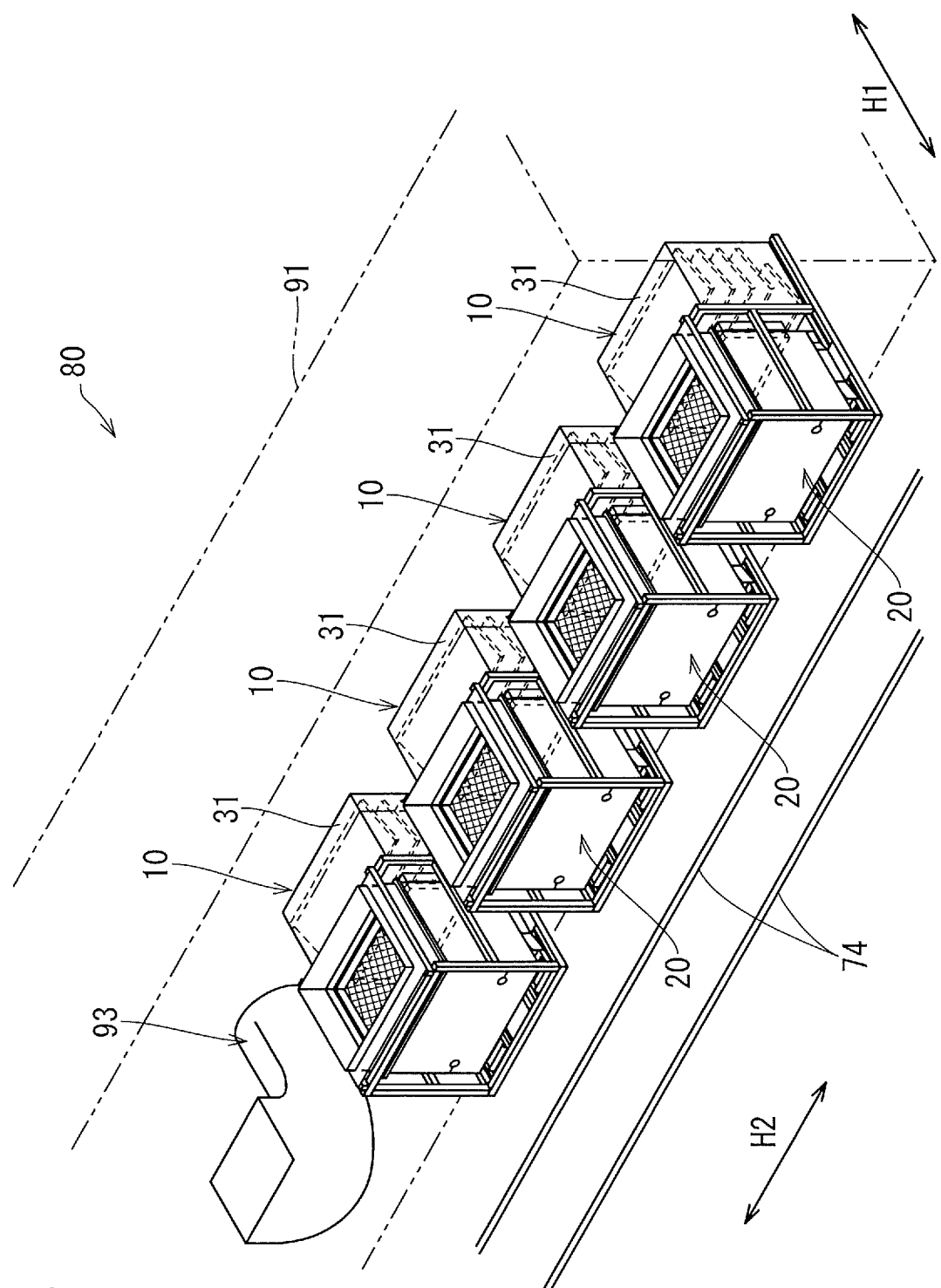
FIG. 12 is a perspective view of the coating material mist remover and an L-shaped duct.

Moreover, as shown in FIG. 1, the base frame 51 is fixed on a support base 95 provided below the exhaust port 89 of the coating booth 81. The support base 95 is connected to the mounting 90 via a beam 96A, columnar supports 96B, and the like. The end portion of the second duct 31, which has the outflow port 34, is in a state of entering the vacuum hole 92 of the exhaust duct 91, and the gap between the inner face of the vacuum hole 92 and the outer face of the second duct 31 is closed. As shown in FIG. 12, the coating material mist removers 10 are connected in this way to the exhaust duct 91 at a plurality of positions in the longitudinal direction.

Note that a plurality of casters 54 is attached to the base frame 51 as shown in FIG. 3. In each caster 54, a ball 54A is rotatably supported by a ball support 54B, and the ball 54A is in a state of protruding downward from the base frame 51.

Accordingly, a single unit of the coating material mist remover 10 can slide on the floor surface of the factory. Furthermore, support bolts 54C are provided at the four corners of the base frame 51. Then, the support bolts 54C can be made protrude farther downward than the balls 54A so that the balls 54A can be lifted off the floor surface, the mountings, and the like.

As shown in FIG. 5, the box-shaped frame 52 is formed by connecting the upper ends of the total of four columnar supports 52A, which stand up from the respective ends and the respective intermediate portions of the pair of first bars 51A, with four upper end beams 52B disposed in quadrangle. Note that the tip of the aforementioned frame-shaped protruding wall 38 of the second duct 31 enters one side of the box-shaped frame 52.

As shown in FIG. 3, the third duct 41 is fixed to the upper portion of the box-shaped frame 52. The third duct 41 has a quadrangular plan cross section and is flat in the vertical direction without top and bottom walls. In addition, the third duct 41 has a double wall structure as shown in FIG. 7. Specifically, the third duct 41 has an inner duct wall 41A, an outer duct wall 41C, and a ceiling frame 41B. The outer duct wall 41C is fitted to the outer side of the upper side portion from the midway of the inner duct wall 41A in the vertical direction with a gap therebetween, and the ceiling frame 41B is sandwiched between the inner surfaces of the upper end portions of the inner duct wall 41A and the outer duct wall 41C. The gap is opened downward. Moreover, fixing members 45 are fixed to the outer sides of the outer duct wall 41C. Then, lower end flanges 45A included in the fixing member 45 project laterally from the lower end portions of the outer duct wall 41C and are stacked on and screwed to the upper face of the box-shaped frame 52.

Upper end flanges 41F project laterally from the upper end portions of the third duct 41 and are stacked under and screwed to lower end flanges (not shown) of the relay duct 94 (see FIG. 1). Note that auxiliary flanges 45B of the fixing members 45 project laterally from the intermediate positions of the outer duct wall 41C in the vertical direction and support the upper end flanges 41F from below.

As shown in FIG. 3, the first duct 11 has a quadrangular plan cross section and is flat in the vertical direction without top and bottom walls. Moreover, as shown in FIG. 7, a groove 18, which has the same structure as the tip of the frame-shaped protruding wall 38 in the aforementioned second duct 31, is formed at the opening edge of an outflow port 14 at the lower end of the first duct 11. A first packing 19 is received inside the groove 18.

Furthermore, the upper side of the first duct 11 from the midway in the vertical direction is fitted to the outer side of the inner duct wall 41A of the third duct 41 with a gap therebetween, and the upper portion of the first duct 11 is received in a gap between the outer duct wall 41C and the inner duct wall 41A. As will be described later, when the first duct 11 moves up and down, the fitted portion between the first duct 11 and the third duct 41 expands and contracts. That is, in the present embodiment, the fitted portion between the first duct 11 and the third duct 41 corresponds to an "extendable portion" in the claims. Note that the first duct 11 and the third duct 41 may be connected by a bellows-structured duct as the "extendable portion."

Figure 8:
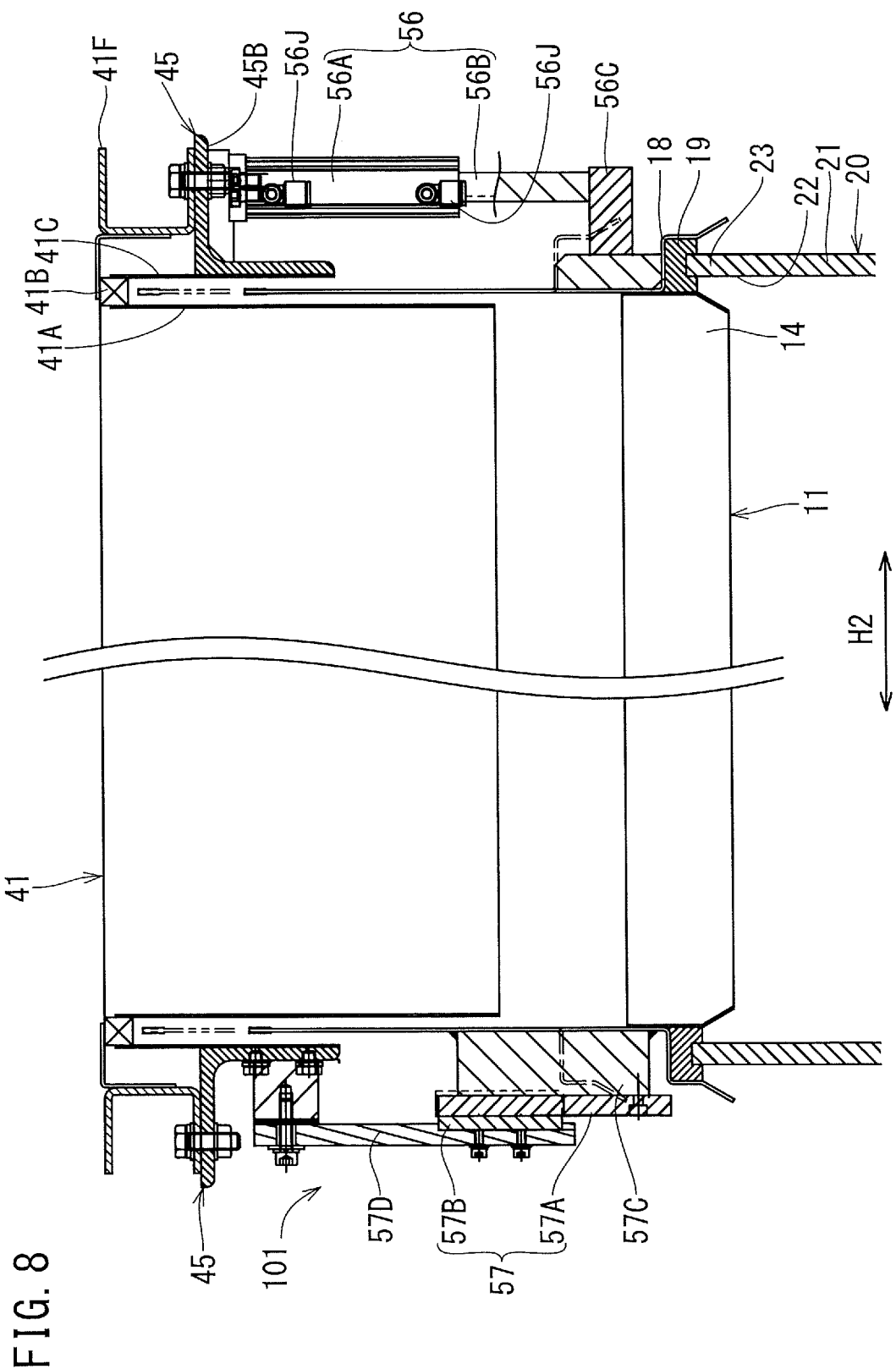
FIG. 8 is a front sectional view of a first duct, an intermediate filter, and a third duct.

The first duct 11 is supported by elevator guides 57 shown on the left side of FIG. 8 so as to be linearly movable in the vertical direction, and is driven upward and downward by air actuators 56 shown on the right side of FIG. 8. In the present embodiment, a first connection mechanism 101 in the claims includes the elevator guides 57 and the air actuators 56.

Specifically, as shown in FIG. 5, at respective positions of the first duct 11, which are close to the lower ends of the outer surfaces of a pair of opposing walls in the second horizontal direction H2 and deviated from the substantial center in the first horizontal direction H1, a pair of first support blocks 57C (only one first support block 57C is shown in FIG. 5) are fixed. As shown on the left side of FIG. 8, guide rails 57A extending in the vertical direction are attached to the first support blocks 57C. Toward these guide rails 57A, a pair of brackets 57D is hung from the aforementioned fixing members 45, and sliders 57B attached to the lower end portions of the brackets 57D are slidably engaged with the guide rails 57A. The aforementioned elevator guides 57 are constituted of the guide rails 57A and the sliders 57B.

As shown in FIG. 5, at respective positions of the first duct 11, which are close to the lower ends of the outer surfaces of the pair of opposing walls in the second horizontal direction H2 and at the substantial center in the first horizontal direction H1, a pair of second support blocks 56C (only one second support block 56C is shown in FIG. 5) are fixed.

Toward these second support blocks 56C, as shown in FIG. 8, on the lower surfaces of the auxiliary flanges 45B of the aforementioned fixing members 45, actuator main bodies 56A of the pair of air actuators 56 are fixed at positions right above the pair of second support blocks 56C and hung from the lower surfaces. Rods 56B protruding from the lower surfaces of the actuator main bodies 56A are fixed to the second support blocks 56C. Moreover, each actuator main body 56A includes a pair of input ports 56J, and an air supply pipe of the factory is connected to the pair of input ports 56J via a valve and a hose (not shown). For example, when a momentary switch 56S (see FIG. 11), which is provided on the side of the box-shaped frame 52 away from the second duct 31, is turned off, compressed air is supplied to one of the input ports 56J, and the first duct 11 moves to the upper end position in the movable range together with the rod 56B by the compressed air. On the other hand, when the momentary switch 56S is turned on, compressed air is supplied to the other input port 56J, and the first duct 11 moves to the lower end position in the movable range together with the rod 56B by the compressed air. As described above, in the present embodiment, the first duct 11 is moved to the upper end position and the lower end position by the air actuators 56 so that the burden on the operator is reduced.

Note that, in the present embodiment, the above-mentioned "upper end position" of the first duct 11 corresponds to a "separation position" in the claims, and the above-mentioned "lower end position" of the first duct 11 corresponds to a "connection position" in the claims.

As shown in FIG. 5, an intermediate filter 20 is detachably attached between the first duct 11 and the second duct 31. The intermediate filter 20 includes an outer wall portion 21 and an inner wall portion 26, which are made of incinerable materials (specifically, corrugated paper). In detail, the outer wall portion 21 includes a rectangular parallelepiped housing 21H whose entire upper face is open. Moreover, the entire inside of a first duct connection portion 23 constituted by the upper portions of four side walls 21S of the housing 21H serves as an inflow port 22 of the intermediate filter 20. Then, as shown in FIG. 7, the entire tip of the first duct connection portion 23 is pushed against the first packing 19 of the first duct 11 so that the first duct 11 and the intermediate filter 20 are connected.

Furthermore, an outflow port 24 is formed by cutting a part of one of the side walls 21S of the housing 21H into quadrangle, and a frame-shaped outer edge wall 24W stays around the outflow port 24. Further, a frame-shaped second duct connection portion 25 surrounding the outflow port 24 protrudes from the outer opening edge of the outflow port 24. The second duct connection portion 25 is also made of corrugated paper. Then, the entire tip of the second duct connection portion 25 is pushed against the second packing 39 of the second duct 31 so that the outer wall portion 21 and the second duct 31 are connected.

Figure 11:
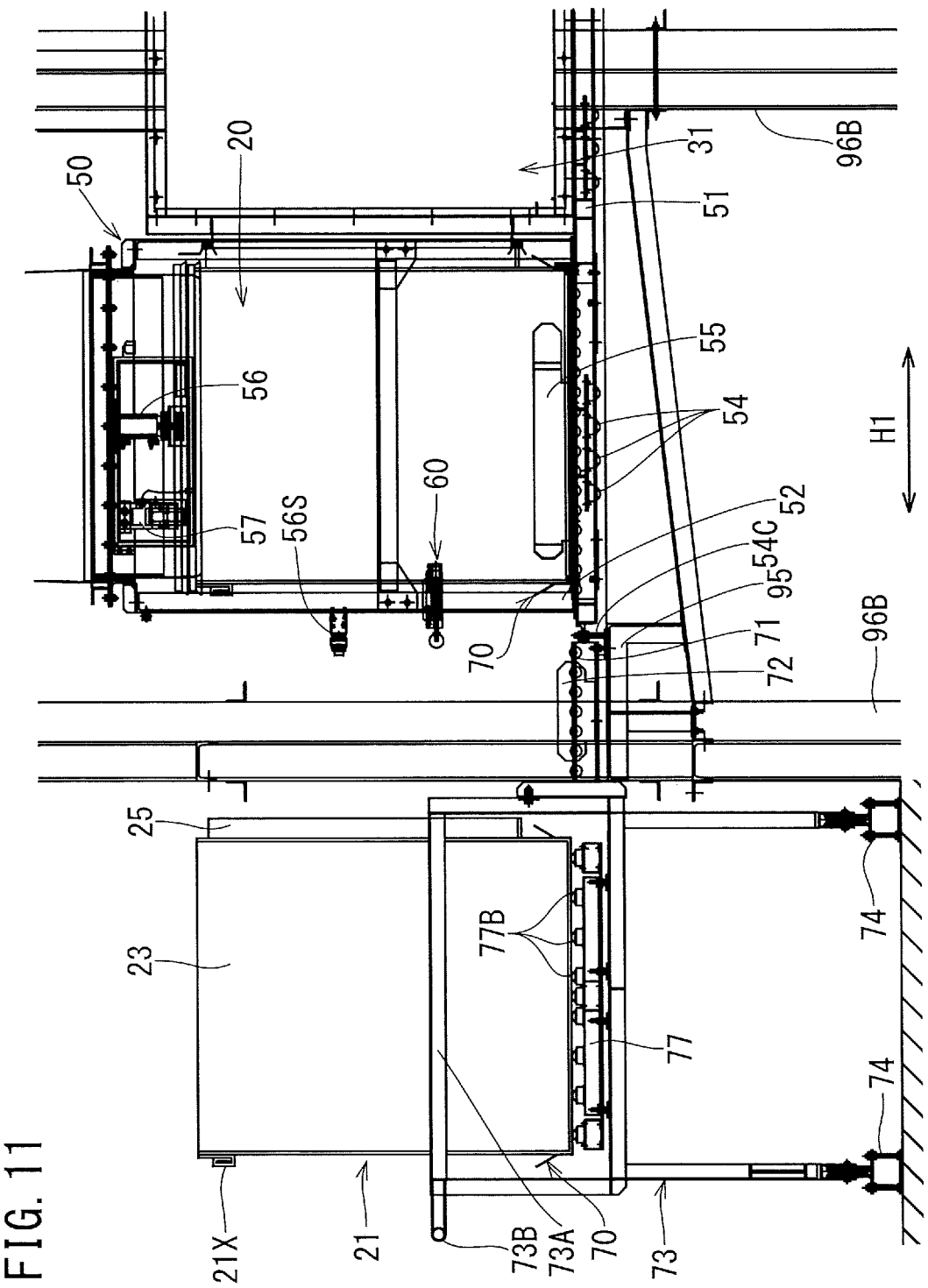
FIG. 11 is a side view of the coating material mist remover.

Note that, for example, band-shaped corrugated paper extending in the second horizontal direction H2 may be stacked on and affixed to the side of the outer wall portion 21 opposite to the outflow port 24 thereby to provide a handle 21X as shown in FIG. 11.

Figure 13:
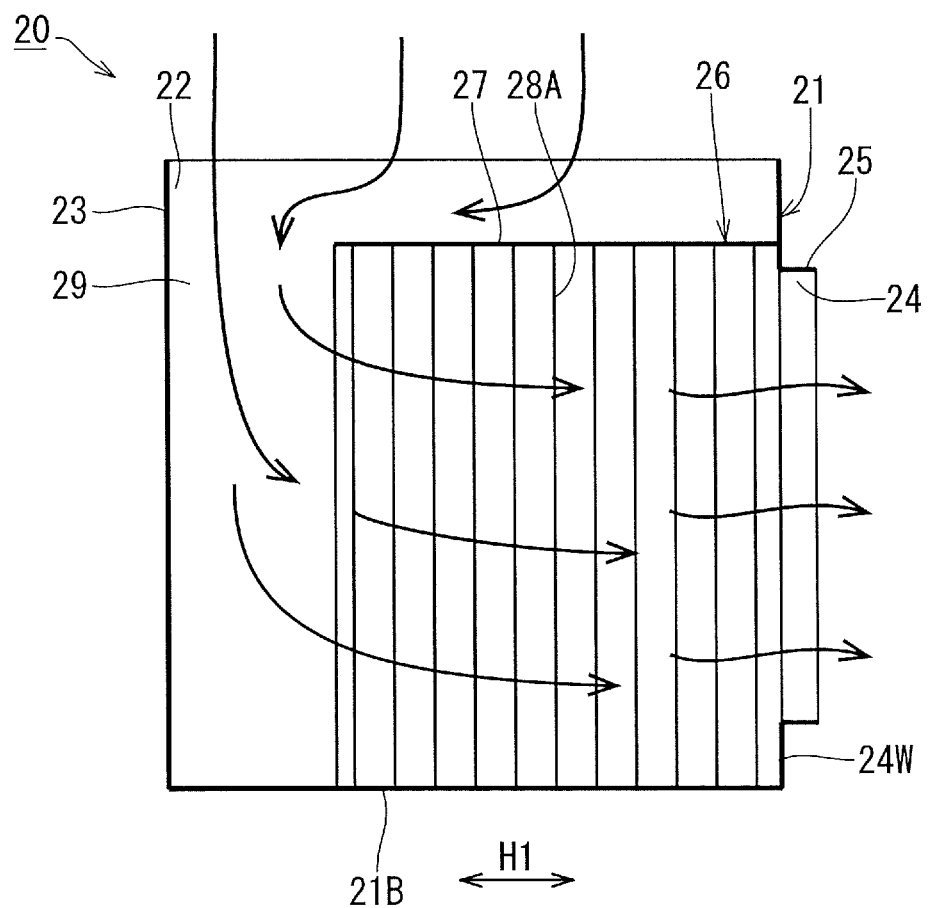
FIG. 13 is a side sectional view of the intermediate filter.

As shown in FIG. 13, the inner wall portion 26 includes a top wall 27 and a plurality of obstacle walls 28A. The top wall 27 has a horizontal plate shape and is disposed at an upper position from the outflow port 24 inside the outer wall portion 21. The top wall 27 has its three outer edges connected to the side wall 21S having the outflow port 24 and the side walls 21S on both sides thereof in the outer wall portion 21 and has a quadrangular passing port 29 between the remaining one outer edge and the remaining side wall 21S of the outer wall portion 21.

Figure 14A:
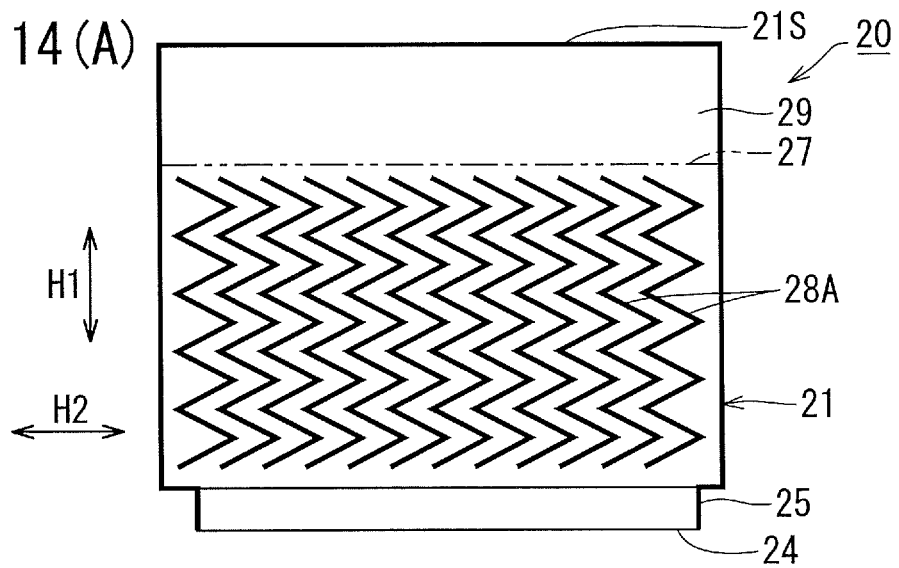
FIGS. 14A to 14C are plan sectional views of the intermediate filter.
Figure 14B:
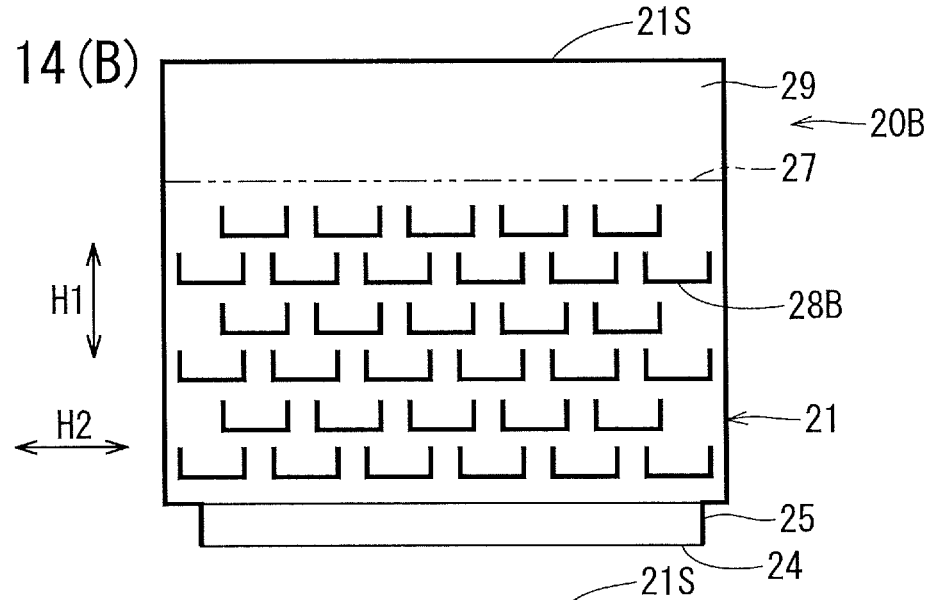
Figure 14C:
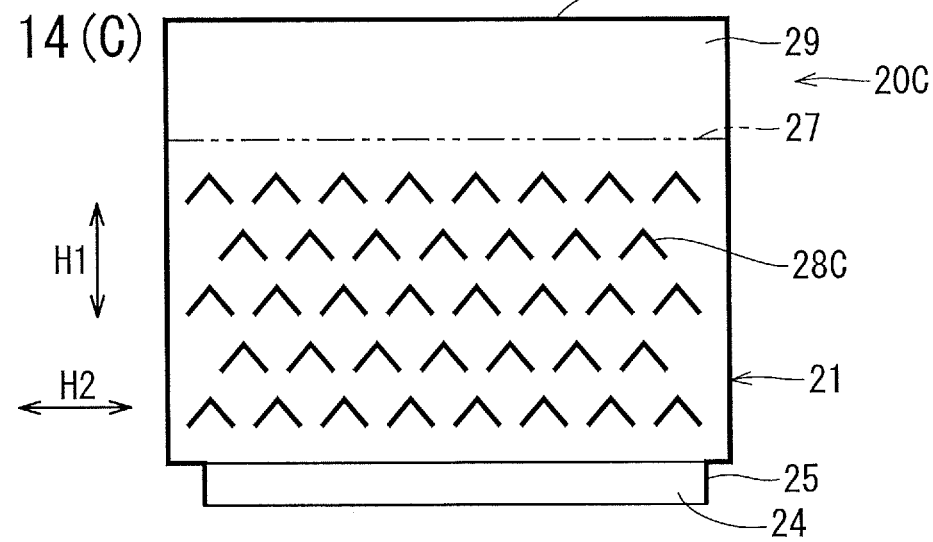

The upper and lower end portions of the plurality of obstacle walls 28A are fixed to the top wall 27 and a bottom wall 21B of the outer wall portion 21 to form a labyrinth structure between the passing port 29 and the outflow port 24. Specifically, as shown in FIG. 14A, the obstacle walls 28A have a plate shape bent so as to form a triangular wave shape extending in the first horizontal direction H1. Moreover, when the plurality of obstacle walls 28A is arranged in the second horizontal direction H2 and viewed from the outflow port 24, the obstacle walls 28A overlap with each other, and the side wall 21 of the outer wall portion 21S on the opposite side to the outflow port 24 cannot be seen. A meandering passage is formed between the adjacent obstacle walls 28A.

The intermediate filter 20 is placed on a metal tray 70 shown in FIG. 5. The tray 70 has a structure in which a pair of opposing pieces 70A (only one opposing piece 70A is shown in FIG. 5) stand up from the centers of a pair of outer edges of a quadrangular metal plate 70P having the same shape as the lower face of the intermediate filter 20. The pair of opposing pieces 70A stands upright from the metal plate 70P and is bent obliquely upward to the sides away from each other. In addition, the intermediate filter 20 is sandwiched between the pair of opposing pieces 70A in the first horizontal direction H1 and placed on the metal plate 70P. Moreover, horizontally long belt insertion holes 70B are formed at the upper end portions of the pair of opposing pieces 70A. When the intermediate filter 20 is conveyed by a single unit, a belt (not shown) passed through the belt insertion holes 70B of the pair of opposing pieces 70A is hooked on the upper surface of the intermediate filter 20, and the tray 70 is fixed to the intermediate filter 20.

The intermediate filter 20 is carried in and out of the box-shaped frame 52 in the first horizontal direction H1 in a state where the first duct 11 is disposed at the upper end position in the movable range. For this purpose, a pair of conveyors 53 is incorporated in the base frame 51 in front of the second duct 31 and extends in the first horizontal direction H1. The intermediate filter 20 slides on a plurality of rollers 53R of each of the conveyors 53, is carried in and out of the box-shaped frame 52, and approaches and separates from the second duct 31.

A pair of guides 55 protrudes upward from the pair of first bars 51A outside the pair of conveyors 53 in the base frame 51. The pair of guides 55 has a band-plate shape extending in the first horizontal direction H1, and the center portions thereof in the longitudinal direction are parallel to each other. The second duct 31 sides of the pair of guides 55 are inclined from the center portions so as to approach each other, and the opposite sides are inclined so as to separate from each other. The intermediate filter 20 is guided to the center portions of the base frame 51 in the second horizontal direction H2 by the pair of guides 55 in the process of approaching the second duct 31, and the entire tip of the second duct connection portion 25 of the intermediate filter 20 opposes the second packing 39 of the second duct 31 in the first horizontal direction H1. From this state, the tip of the second duct connection portion 25 of the intermediate filter 20 contacts the second packing 39 of the second duct 31, so that the tip of the first duct connection portion 23 of the intermediate filter 20 opposes the first packing 19 of the first duct 11 in the vertical direction. In this state, the first duct 11 descends from the upper end position to the lower end position, and the entire tip of the first duct connection portion 23 of the intermediate filter 20 contacts the first packing 19 of the first duct 11.

Note that, in the present embodiment, the position of the intermediate filter 20 when the second duct connection portion 25 and the second packing 39 are in contact corresponds to a "connection position" in the claims, and the position of the intermediate filter 20 when the second duct connection portion 25 and the second packing 39 separate corresponds to a "separation position" in the claims.

Figure 9:
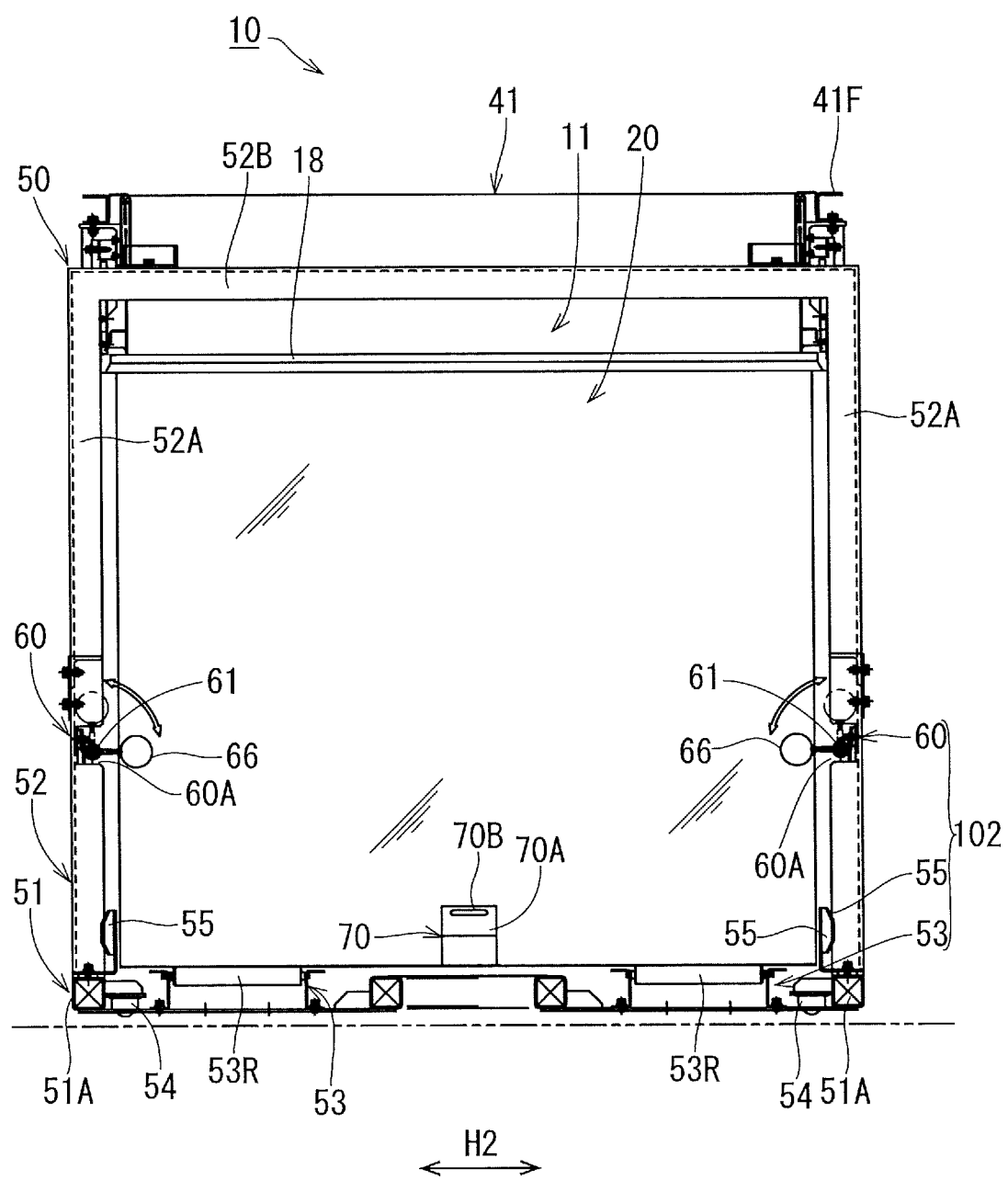
FIG. 9 is a front view of the coating material mist remover.

As shown in FIG. 9, in order to hold the intermediate filter 20 at the "connection position," a pair of pressing mechanisms 60 is provided at the intermediate portions in the vertical direction of the pair of columnar supports 52A on the side of the box-shaped frame 52 away from the second duct 31. In the present embodiment, a second connection mechanism 102 in the claims includes the above-described pair of pressing mechanisms 60, the aforementioned pair of conveyors 53, and the pair of aforementioned guides 55.

Figure 10:
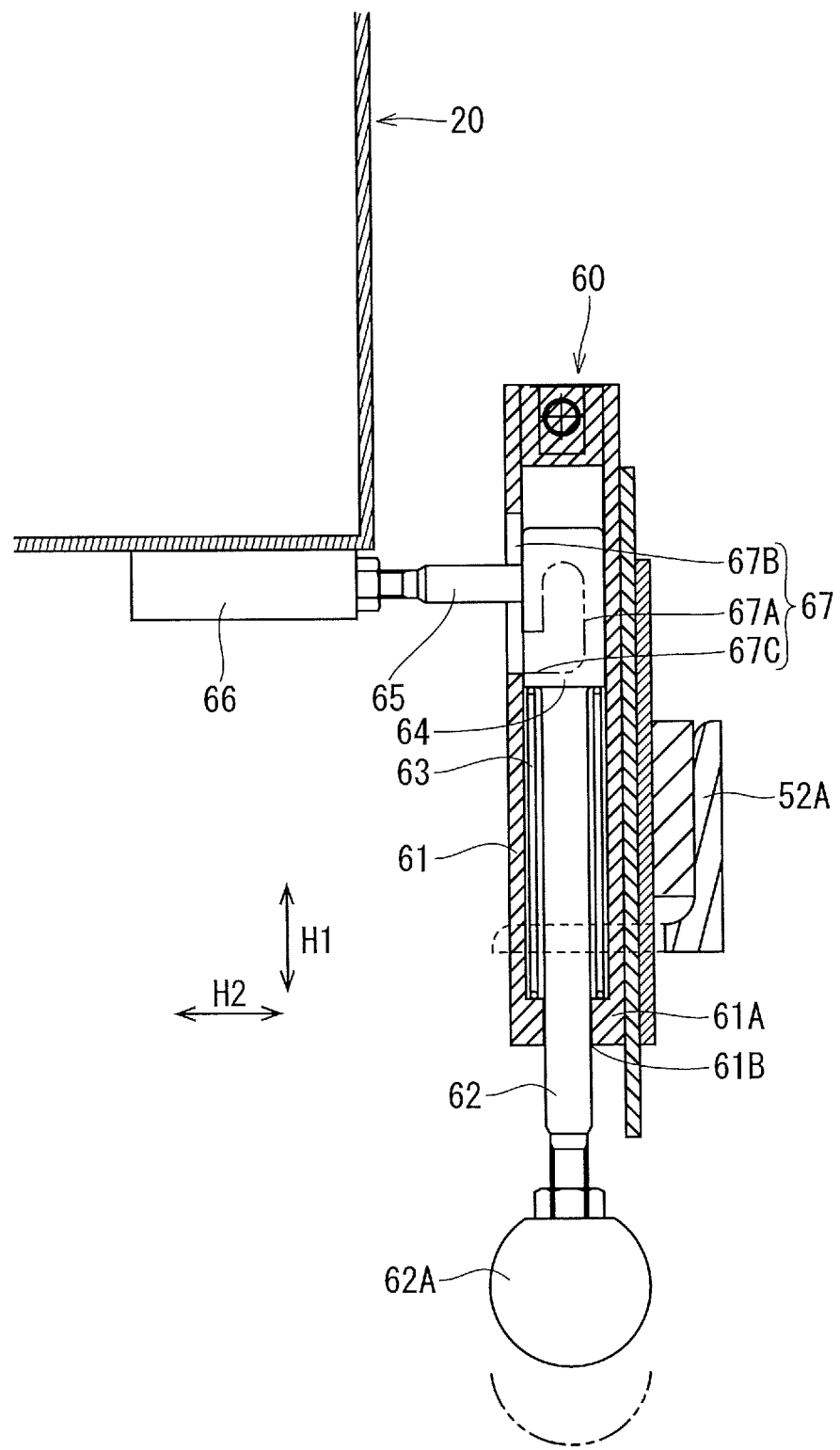
FIG. 10 is a plan sectional view of a pressing mechanism.

The specific structure of the pressing mechanisms 60 is as follows. That is, the vertically intermediate portions of the opposing surfaces of the pair of columnar supports 52A are cut out to form respective recesses 60A, and each of the pressing mechanism 60 has a support sleeve 61 fixed inside the recess 60A. As shown in FIG. 10, the support sleeve 61 has a cylindrical shape extending in the first horizontal direction H1, and a circular columnar movable base 64 is rotatably and linearly movably accommodated therein. Moreover, both ends of the support sleeve 61 are closed, and a through hole 61B is formed in the center portion of an end wall 61A on the side of the support sleeve 61 away from the second duct 31 (the lower side in FIG. 10). One end of a shaft 62 penetrating the through hole 61B is coupled with the movable base 64 inside the support sleeve 61, and a spherical operation portion 62A is fixed to the other end of the shaft 62. Moreover, a compression coiled spring 63 is provided between the end wall 61A and the movable base 64, and the movable base 64 is urged toward the second duct 31 (the upper side in FIG. 10).

A guide hole 67 is formed on a side surface of the support sleeve 61, and a bar 65 that penetrates the guide hole 67 is coupled with the movable base 64. The guide hole 67 includes: a first linear portion 67A which is a portion directed upward in the side surface of the support sleeve 61 and extends in the first horizontal direction H1; a second linear portion 67B which is a portion directed toward the intermediate filter 20 in the side surface of the support sleeve 61 and extends in the first horizontal direction H1; and a junction 67C that connects the end portions of the first linear portion 67A and the second linear portion 67B closer to the end wall 61A. The end portions of the first linear portion 67A and the second linear portion 67B on the end wall 61A side are disposed at the same position in the first horizontal direction H1, and the junction 67C extends in the circumferential direction of the support sleeve 61. Furthermore, the second linear portion 67B is longer than the first linear portion 67A.

A pressing plate 66 flattened in the first horizontal direction H1 is fixed to the tip of the bar 65. When the bar 65 is disposed in the first linear portion 67A, the pressing plate 66 is retracted outside the moving region of the intermediate filter 20 (the state shown by the two-dot chain line in FIG. 9). In this state, the intermediate filter 20 is carried in and out of the box-shaped frame 52. Then, when the intermediate filter 20 is moved to the "connection position" where the intermediate filter 20 is connected to the second duct 31 and the bar 65 is disposed in the second linear portion 67B (the state shown by the solid line in FIG. 9), the pressing plate 66 presses the intermediate filter 20 toward the second duct 31. Accordingly, the intermediate filter 20 is held at the "connection position." Note that the operation of moving the pressing plate 66 can be performed by twitching the operation portion 62A.

Note that the pressing mechanism 60 of the second connection mechanism 102 presses the intermediate filter 20 by the resilient force of the compression coiled spring 63, but the intermediate filter 20 may be pressed by the resilient force of a tension coiled spring, a torsion spring or the like or by pressure from compressed air. Further, although one pair of pressing mechanisms 60 is provided in the second horizontal direction H2, a plurality of pairs of the pressing mechanisms 60 may be provided, or one pressing mechanism 60 may be provided at the center in the second horizontal direction H2. Moreover, at least some rollers 53R of the conveyors 53 may be rotationally driven to urge the intermediate filter 20 toward the second duct 31 by those rollers 53R. Furthermore, the second connection mechanism 102 may be configured such that, for example, a belt is attached to the second duct 31 instead of the pressing mechanism 60, and the intermediate filter 20 is pressed against the second duct 31 by the belt. Further, instead of the conveyors 53, a simple flat plate may be provided on which the intermediate filter 20 slides. Moreover, as in the case where the first duct 11 is made movable by providing the extendable portion between the first duct 11 and the third duct 41, an extendable portion may also be provided between the exhaust duct 91 and the second duct 31 to movably support the second duct 31 in the first horizontal direction H1, and the second duct 31 may be moved toward the intermediate filter 20 by utilizing the pressing plate 66 as a stopper so that the intermediate filter 20 and the second duct 31 are connected.

In addition, as a modification example of the aforementioned first connection mechanism 101, the first duct 11 may be moved up and down by, for example, a manual lever instead of the air actuator 56. Alternatively, the intermediate filter 20 may be moved up and down by a motor or an air actuator so as to be brought into and out of contact with the first duct 11. Furthermore, like the extendable mechanism between the first duct 11 and the third duct 41, the connection between the first duct connection portion 23, which is the upper end portion of the intermediate filter 20, and the main body of the intermediate filter 20 other than the first duct connection portion 23 may be made extendable, the rods 56B of the pair of air actuators 56 may be hung from the base frame 51, hooks may be provided at the lower end portions of the rods 56B, and the hooks may be engaged with the first duct connection portion 23 to move up and down.

The description of the structure of the coating material mist remover 10 has been given above. Next, a structure for conveying the intermediate filter 20 of the coating equipment 80 will be described. As shown in FIG. 12, in the coating equipment 80, a pair of rails 74 and a carriage 73 (see FIG. 11) are provided on the side opposite to the exhaust duct 91 for the plurality of coating material mist removers 10 connected to the exhaust duct 91. The pair of rails 74 extends parallel to the exhaust duct 91, and the carriage 73 moves on the pair of rails 74.

Moreover, as shown in FIG. 11, a rolling support base 77 is fixed to the upper surface of the carriage 73. The rolling support base 77 has a structure in which the plurality of aforementioned casters 54 of the base frame 51 is mounted upside down, and a plurality of balls 77B is rotatably provided on the upper surface of the rolling support base 77. Furthermore, on the support base 95, a pair of conveyors 71 (only one conveyor 71 is shown in FIG. 11) is disposed on an extension of the pair of conveyors 53 of the coating material mist removers 10. The intermediate filter 20 slides horizontally on the rolling support base 77 and the conveyors 53 and 71. At this time, in the present embodiment, since the lower portion of the intermediate filter 20 is received by the tray 70, it is possible to prevent the intermediate filter 20 from being deformed or damaged during conveyance.

Note that a pair of guides 72 (only one guide 72 is shown in FIG. 11) is provided on both sides of the pair of conveyors 71. The interval between the pair of guides 72 is equal to or wider than the interval between the most distant portions of the aforementioned pair of guides 55 of the coating material mist remover 10. In addition, the carriage 73 is provided with a protection bar 73A for preventing the intermediate filter 20 on the rolling support base 77 from moving in a direction other than the direction opposing the coating material mist remover 10, and a handle 73B projects from the protection bar 73A.

The description of the structure of the coating equipment 80 of the present embodiment has been given above. Next, the effects of the coating equipment 80 will be described. When the coating line 82 runs and the inside of the exhaust duct 91 is in a negative pressure state, the air in the coating area in the coating booth 81 flows into the exhaust duct 91 through the plurality of coating material mist removers 10. At that time, unattached coating material mist contained in the air is removed by the intermediate filter 20 of each of the coating material mist removers 10. Specifically, as shown by the arrows in FIG. 13, the air flowed into the intermediate filter 20 from the inflow port 22 hits the top wall 27 and is then collected to the passing port 29, from which the air passes through a plurality of meandering spaces between the plurality of obstacle walls 28A to the outflow port 24. Meanwhile, the coating material mist contained in the air hits and adheres to the inner surface of the intermediate filter 20, thereby removing the coating material mist from the air. Moreover, the coating material mist that has passed without being completely removed by the intermediate filter 20 is removed by the downstream filter 35F in the second duct 31 shown in FIG. 5. Then, the air from which the coating material mist has been removed flows into the exhaust duct 91. In addition, the air in the coating booth 81 other than the coating area does not contain coating material mist and flows into the exhaust duct 91 through the L-shaped duct 93 (FIGS. 2 and 12).

The air flowed into the exhaust duct 91 undergoes, for example, VOC removal treatment by a deodorizer (not shown) and is then discharged outside the factory. At this time, even if coating material mist remains in the air, the coating material mist is removed by the deodorizer.

Incidentally, as the amount of coating material mist accumulated in the intermediate filter 20 and the downstream filter 35F increases, the fluid resistance against the air passing through the intermediate filter 20 and the downstream filter 35F increases, and the differential pressure between the upstream side and the downstream side of the intermediate filter 20 and the differential pressure between the upstream side and the downstream side of the downstream filter 35F rise. These differential pressures are detected by the pressure sensors 37A, 37B and 37C of the coating material mist remover 10. When it is determined based on the detection results that the coating material mist has been accumulated in the intermediate filter 20 and the downstream filter 35F over a reference value, a warning light turns on.

In response to this, the intermediate filter 20 of the coating material mist remover 10 with a warning light turned on is replaced, for example, during the time when maintenance is performed by stopping the coating line 82 regularly in a day. Specifically, the momentary switch 56S (see FIG. 11) of the coating material mist remover 10 with the warning light turned on is turned off, and the first duct 11 is moved upward. In addition, the pressing plate 66 (see FIG. 10) of the pressing mechanism 60 is moved out of the moving region of the intermediate filter 20. Then, the used intermediate filter 20 is moved to the carriage 73 disposed at a position opposing the coating material mist remover 10. Note that, at this time, it is visually confirmed whether or not the plurality of downstream filters 35F in the second duct 31 can be still used, and only an unusable downstream filter 35F is replaced. As described above, in the present embodiment, based on the pressure change in the second duct 31 detected by the pressure sensors 37A, 37B and 37C, the degree of clogging of the intermediate filter 20 (i.e., the amount of accumulated coating material in the intermediate filter 20) can be estimated, and the timing to replace the intermediate filter 20 can be easily determined. Furthermore, when the downstream filter 35F is provided in the second duct 31, the degree of clogging of the downstream filter 35F can be estimated together, and the timing to replace the downstream filter 35F can be easily determined.

The used intermediate filter 20 and downstream filter 35F are collected by the carriage 73 to a waste collection place. Then, the carriage 73 carrying a new intermediate filter 20 is moved to a position opposing the coating material mist remover 10. The new intermediate filter 20 is pushed and moved toward the second duct 31 of the coating material mist remover 10, and the second duct connection portion 25 contacts the second packing 39. Then, the pressing mechanism 60 (see FIG. 10) is operated, and the intermediate filter 20 is urged toward the second duct 31 by the pressing plate 66 and held at the connection position. In this state, the momentary switch 56S (see FIG. 11) is turned on, the first duct 11 moves downward, and the first packing 19 of the first duct 11 contacts the first duct connection portion 23 of the intermediate filter 20. Thus, the replacement of the intermediate filter 20 is completed. In addition, the intermediate filter 20 and the downstream filter 35F collected at the waste collection place are incinerated together with the coating material adhered thereto.

As described above, the coating material mist remover 10 of the coating equipment 80 of the present embodiment includes a detachable incinerable intermediate filter 20 and removes coating material mist from the air by the intermediate filter 20. Then, the intermediate filter 20 that has collected a predetermined amount or more of coating material mist is replaced with a new intermediate filter 20, and the used intermediate filter 20 is incinerated. Thus, collected coating material can be easily disposed. Moreover, the coating material mist remover of the present embodiment does not require water circulation equipment and can be installed in a narrower space than before. Furthermore, the intermediate filter 20 has a structure in which the first duct connection portion 23 is provided on the upper face while the second duct connection portion 25 is provided on the side face, thereby separating the connection with the first duct 11 and the connection with the second duct 31. Accordingly, the connection between the first duct 11 and the intermediate filter 20 and the connection between the second duct 31 and the intermediate filter 20 can be each performed reliably and easily, and the packings 19 and 39 of the respective connection portions can be reliably squeezed thereby to reliably seal. Further, since the intermediate filter 20 receives wind pressure from above, a load due to the wind pressure can be received by a portion (conveyor 71) supporting the intermediate filter 20 from below, and a load to the connection portions between the intermediate filter 20 and the first and second ducts 11 and 31 can be suppressed.

Moreover, since the intermediate filter 20 is made of paper, the intermediate filter can be easily manufactured at low cost and can be easily incinerated. Furthermore, since the downstream filter 35F for removing the coating material mist that has passed through the intermediate filter 20 is also made of paper, the downstream filter 35F can be easily manufactured at low cost and can be easily incinerated.

Further, the flow rate and the flow velocity of the air flowing through the intermediate filter 20 can be changed and adjusted by the flow rate adjuster 36 of the second duct 31 so that the collection efficiency of the coating material by the intermediate filter 20 can be improved.

Moreover, in the coating equipment 80 of the present embodiment, since the plurality of coating material mist removers 10 is arranged below the underfloor wall 88 of the coating booth 81, the distance between the coating booth 81 and the intermediate filter 20 can be shortened, and the duct therebetween is easily cleaned. Furthermore, as shown in FIG. 1, the weir 88T protrudes from the underfloor wall 88 of the coating booth 81 to restrict the flow of the liquid into the exhaust port 89 of the underfloor wall 88, and thus the deterioration of the intermediate filter 20 due to the liquid can be prevented. Further, the intermediate filter 20 can be easily carried in and out of any selected coating material mist remover 10 by using the rails 74 which extend parallel to the coating line 82 and the carriage 73 which moves on the rails 74.

Second Embodiment

Although not shown, coating equipment according to the present embodiment is a modification of the coating equipment 80 according to the first embodiment, and the interval between coating material mist removers 10 is wider than that of the first embodiment. Moreover, in an intermediate filter 20, an inflow port 22 is open on one side face opposite to an outflow port 24. Correspondingly, a third duct 41 and a first duct 11 are attached to the opposite side of a second duct 31 in a box-shaped frame 52, and a relay duct 94 hanging down from a coating booth 81 is bent to be connected to the third duct 41. Furthermore, the intermediate filter 20 is inserted between the first duct 11 and the second duct 31 in a second horizontal direction H2. For this purpose, conveyors 53 extend in the second horizontal direction H2. Then, a first duct connection portion 23 around the inflow port 22 of the intermediate filter 20 is pressed against a first packing 19 of the first duct 11 and a second duct connection portion 25 of the intermediate filter 20 is pressed against a second packing 39 of the second duct 31 by the power of an air actuator 56, thereby connecting the intermediate filter 20 to the first duct 11 and the second duct 31.

Note that the present embodiment may be further modified such that the inflow port 22 and the outflow port 24 are open on the upper face and the lower face of the intermediate filter 20, and the intermediate filter 20 is sandwiched between the first duct 11 and the second duct 31 in the vertical direction to be connected thereto.

Other Embodiments (1) The intermediate filter 20 according to the first embodiment is made of corrugated paper, but may be made of a material other than corrugated paper as long as the material can be incinerated. Specifically, the intermediate filter 20 may be made of wood, resin, a molded product of sawdust, paper or powder, woven fabric, nonwoven fabric or the like, or a combination thereof. The same applies to the downstream filter 35F.

(2) Only the outer wall portion 21 of the intermediate filter 20 according to each of the aforementioned embodiments may be made of, for example, a non-incinerable metal, resin, or the like, and the used intermediate filter 20 may be washed with a solution for coating material and reused.

(3) The intermediate filter 20 according to the first embodiment has a box-shape, but may be a cylindrical or angular tubular shape having both ends open, or a cylindrical or angular tubular shape having one end open and a through hole on a side face.

(4) The intermediate filter 20 according to the first embodiment includes therein the plurality of obstacle walls 28A bent in a triangular wave shape, but is not limited thereto. Any structure may be adopted as long as a flow path which the air passes through is shaped in a maze. Specifically, like the intermediate filter 20B shown in FIG. 14B, columnar supports 28B with an angular groove structure may be arranged with gaps therebetween from a top wall 27 to a bottom wall 21B (see FIG. 13) of the outer wall portion 21 so as to form a line in a second horizontal direction H2, and a plurality of the lines of the columnar supports 28B may be provided in a first horizontal direction H1 so that the gaps are arranged to be shifted from each other in the lines adjacent in the first horizontal direction H1. Alternatively, like the intermediate filter 20C shown in FIG. 14C, columnar supports 28C with a V-shaped groove structure may be arranged instead of the columnar supports 28B with the angular groove structure. Furthermore, corrugated paper walls having a plurality of through holes may be provided in the vicinity of the inflow port 22 and in the vicinity of the outflow port 24 of the intermediate filter 20, and a space therebetween may be filled with corrugated paper pieces obtained by cutting into chips. Alternatively, band-shaped corrugated paper having a plurality of through holes may be wound in a spiral shape having a gap and fixed in the intermediate filter 20. Further, in the intermediate filter 20 according to the first embodiment, the top wall 27 may be inclined such that the passing port 29 side is lowered.

(5) In the first embodiment, the outflow port 24 side of the intermediate filter 20 of the coating material mist remover 10 is connected to the second duct 31. However, the outflow port 24 side of the intermediate filter 20 may be directly connected to the exhaust duct 91, or the end portion of the intermediate filter 20 on the outflow port 24 side may be open to the atmosphere without being connected to another duct.

(6) Although the coating material mist remover 10 does not require water circulation equipment, part of the coating equipment 80 may be provided with water circulation equipment.

(7) In the first embodiment, as shown in FIG. 7, the first duct connection portion 23 and the second duct connection portion 25 of the intermediate filter 20 are brought into contact with the first packing 19 and the second packing 39. However, without providing the grooves 18 and 38M in the first duct 11 and the second duct 31, the first duct connection portion 23 and the second duct connection portion 25 may be fitted to the first duct 11 and the inner side or the outer side of the frame-shaped protruding wall 38 of the second duct 31. Further, packings may be affixed to the first duct connection portion 23 and the second duct connection portion 25.

(8) Instead of the flow rate adjuster 36 according to the first embodiment, the configuration may be such that, for example, the outflow port 34 of the second duct 31 is covered with a fixed plate having a plurality of through holes, a movable plate having the same shape as the fixed plate is stacked on the fixed plate and slidably supported, and the amount of overlap between the through holes is changed depending on the slide position of the movable plate. Alternatively, a plurality of fixed plates having different numbers of through holes or different opening areas is prepared, and an appropriate fixed plate is selected, stacked on and fixed to the outflow port 34 of the second duct 31 so that the flow rate passing the second duct 31 can be adjusted.

(9) The conveyors 53 provided in the coating material mist remover 10 according to the first embodiment has the rollers 53R, but the conveyors 53 may be provided with a plurality of balls like the rolling support base 77.

(10) The guides 55 according to the first embodiment have a band-plate shape extending in the first horizontal direction H1 as shown in FIG. 5, but may have a pole shape extending in the first horizontal direction H1. In addition, the tray 70 may have a box shape which is flat in the vertical direction and has an open upper face.

(11) The coating line 82 according to the first embodiment uses an automobile component as the coating target workpiece W, but the coating target workpiece of the coating line 82 is not limited to an automobile component and may be a component of a vehicle other than an automobile, a home appliance, an industrial product, or the like.

What is claimed is:

1. A coating material mist remover comprising:
   a first duct that discharges air containing a coating material mist from an outflow port directed downward;
   a second duct having an inflow port directed in a horizontal direction;
   an intermediate filter that has a first duct connection portion on an upper face and a second duct connection portion on a side face, removes the coating material mist from the air, and is incinerable, the first duct connection portion being detachably connected to the outflow port of the first duct, and the second duct connection portion being detachably connected to the inflow port of the second duct;
   a first connection mechanism that vertically movably supports the first duct or the intermediate filter to a connection position where the first duct and the intermediate filter are connected to each other and to a separation position where the first duct and the intermediate filter are separated from each other, and holds the first duct and the intermediate filter at the connection and separation positions;
   a second connection mechanism that horizontally movably supports the second duct or the intermediate filter to a connection position where the second duct and the intermediate filter are connected to each other and to a separation position where the second duct and the intermediate filter are separated from each other, and holds the second duct and the intermediate filter at the connection and separation positions; and
   a flow rate adjuster that changes a flow rate of air able to pass through the second duct, the flow rate adjuster comprising:
      a plurality of rotary blades extending in parallel across the outflow port of the second duct; and
      a blade lock that holds the rotary blades at any desired rotary position.

2. The coating material mist remover according to claim 1, further comprising:
   a first packing that is provided at an opening edge of the outflow port of the first duct and against which the first duct connection portion is pushed; and
   a second packing that is provided at an opening edge of the inflow port of the second duct and against which the second duct connection portion is pushed.

3. The coating material mist remover according to claim 1, wherein the intermediate filter is made of paper.

4. The coating material mist remover according to claim 1, further comprising:
   a tray that receives a lower portion of the intermediate filter.

5. The coating material mist remover according claim 1, further comprising:
   an incinerable downstream filter disposed inside the second duct.

6. The coating material mist remover according to claim 1, further comprising:
   a pressure sensor that detects a pressure inside the second duct.

7. The coating material mist remover according to claim 1, wherein the second connection mechanism comprises:
   a conveyor that movably supports the intermediate filter from below in a first horizontal direction where the intermediate filter and the second duct are arranged;
   guides that oppose each other with the intermediate filter interposed therebetween in a second horizontal direction perpendicular to the first horizontal direction and that guide the intermediate filter to the connection position in the second horizontal direction; and
   a pressing mechanism configured to press the intermediate filter toward the second duct.

8. The coating material mist remover according to claim 7, wherein the first connection mechanism comprises:

an elevator guide that movably supports the first duct in a vertical direction to the connection position and the separation position; and
an air actuator that alternatively urges the first duct to the connection position and the separation position by switch operation.

9. The coating material mist remover according to claim 8, further comprising:
a third duct that protrudes upward from the first duct; and
an extendable portion that connects the first duct and the third duct and expands and contracts as the first duct moves.

10. Coating equipment comprising:
a coating booth that covers a coating line;
an underfloor wall that is provided below a floor of the coating booth and has a plurality of exhaust ports arranged in a longitudinal direction of the coating line;
a plurality of coating material mist removers in according to claim 9, the plurality of coating material mist removers being arranged below the underfloor wall and in the longitudinal direction of the coating line, in which the third ducts are fixed to the underfloor wall and connected to the exhaust ports; and
an exhaust duct that extends parallel to the longitudinal direction of the coating line and is connected to downstream end portions of the plurality of the coating material mist removers.

11. The coating equipment according to claim 10, further comprising:
a rail that extends parallel to the coating line and is for conveying a single unit of the intermediate filter to any selected coating material mist remover.

12. The coating equipment according to claim 10, further comprising:
a weir that protrudes upward from the underfloor wall and restricts a flow of liquid into the exhaust ports of the underfloor wall.

13. A coating material mist remover comprising:
a first duct that discharges air containing a coating material mist from an outflow port directed downward;
a second duct having an inflow port directed in a horizontal direction;
an intermediate filter that has a first duct connection portion on an upper face and a second duct connection portion on a side face, removes the coating material mist from the air, and is incinerable, the first duct connection portion being detachably connected to the outflow port of the first duct, and the second duct connection portion being detachably connected to the inflow port of the second duct;
a first connection mechanism that vertically movably supports the first duct or the intermediate filter to a connection position where the first duct and the intermediate filter are connected to each other and to a separation position where the first duct and the intermediate filter are separated from each other, and holds the first duct and the intermediate filter at the connection and separation positions; and
a second connection mechanism that horizontally movably supports the second duct or the intermediate filter to a connection position where the second duct and the intermediate filter are connected to each other and to a separation position where the second duct and the intermediate filter are separated from each other, and holds the second duct and the intermediate filter at the connection and separation positions, wherein the first connection mechanism comprises:
an elevator guide that movably supports the first duct in a vertical direction to the connection position and the separation position; and
an air actuator that alternatively urges the first duct to the connection position and the separation position by switch operation.

14. The coating material mist remover according to claim 13, further comprising:
a third duct that protrudes upward from the first duct; and
an extendable portion that connects the first duct and the third duct and expands and contracts as the first duct moves.

15. Coating equipment comprising:
a coating booth that covers a coating line;
an underfloor wall that is provided below a floor of the coating booth and has a plurality of exhaust ports arranged in a longitudinal direction of the coating line;
a plurality of coating material mist removers according to claim 14, the plurality of coating material mist removers being arranged below the underfloor wall and in the longitudinal direction of the coating line, in which the third ducts are fixed to the underfloor wall and connected to the exhaust ports; and
an exhaust duct that extends parallel to the longitudinal direction of the coating line and is connected to downstream end portions of the plurality of the coating material mist removers.

16. The coating equipment according to claim 15, further comprising:
a rail that extends parallel to the coating line and is for conveying a single unit of the intermediate filter to any selected coating material mist remover.

17. The coating equipment according to claim 15, further comprising:
a weir that protrudes upward from the underfloor wall and restricts a flow of liquid into the exhaust ports of the underfloor wall.

18. The coating equipment according to claim 16, further comprising:
a weir that protrudes upward from the underfloor wall and restricts a flow of liquid into the exhaust ports of the underfloor wall.

19. A coating material mist remover comprising:
a first duct that discharges air containing a coating material mist from an outflow port directed downward;
a second duct having an inflow port directed in a horizontal direction;
an intermediate filter that has a first duct connection portion on an upper face and a second duct connection portion on a side face, removes the coating material mist from the air, and is incinerable, the first duct connection portion being detachably connected to the outflow port of the first duct, and the second duct connection portion being detachably connected to the inflow port of the second duct;
a first connection mechanism that vertically movably supports the first duct or the intermediate filter to a connection position where the first duct and the intermediate filter are connected to each other and to a separation position where the first duct and the intermediate filter are separated from each other, and holds the first duct and the intermediate filter at the connection and separation positions;
a second connection mechanism that horizontally movably supports the second duct or the intermediate filter to a connection position where the second duct and the intermediate filter are connected to each other and to a separation position where the second duct and the intermediate filter are separated from each other, and holds the second duct and the intermediate filter at the connection and separation positions.

\* \* \* \* \*